US012750654B2

(12) United States Patent
Zhou

(10) Patent No.: US 12,750,654 B2
(45) Date of Patent: Sep. 29, 2026

(54) INFORMATION OBTAINING METHOD AND APPARATUS, AND SYSTEM

(71) Applicant: Huawei Technologies Co., Ltd., Shenzhen (CN)

(72) Inventor: Xiaoyun Zhou, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 335 days.

(21) Appl. No.: 18/417,320

(22) Filed: Jan. 19, 2024

(65) Prior Publication Data

US 2024/0155325 A1 May 9, 2024

Related U.S. Application Data

(63) Continuation of application No. PCT/CN2022/097406, filed on Jun. 7, 2022.

(30) Foreign Application Priority Data

Jul. 20, 2021 (CN) ......................... 202110820760.7

(51) Int. Cl.
*H04W 8/14* (2009.01)

(52) U.S. Cl.
CPC ..................................... *H04W 8/14* (2013.01)

(58) Field of Classification Search
CPC .................................. H04W 8/14; H04W 8/18
See application file for complete search history.

(56) References Cited

U.S. PATENT DOCUMENTS

2023/0017217 A1* 1/2023 Zhu ........................ H04W 76/40
2023/0065081 A1* 3/2023 Mantha ................. H04W 76/12
(Continued)

FOREIGN PATENT DOCUMENTS

WO 2022267824 A1 12/2022

OTHER PUBLICATIONS

3GPP TS 23.502 V15.10.0 (Jul. 2020), 3rd Generation Partnership Project; Technical Specification Group Services and System Aspects; Procedures for the 5G System (5GS); Stage 2,(Release 15), total 363 pages.

(Continued)

*Primary Examiner* — Mazda Sabouri
(74) *Attorney, Agent, or Firm* — Slater Matsil, LLP

(57) ABSTRACT

This application provides an information obtaining method, and includes: A first policy control network element receives first information of user equipment from an application function network element, where the first information is for deciding a mobility management policy and includes session information of the user equipment, the first policy control network element decides the mobility management policy. The first policy control network element sends, to a binding support function network element, a message for obtaining information about a second policy control network element, where the second policy control network element is a policy control network element that serves a session corresponding to the session information, the message for obtaining the information about the second policy control network element includes the session information and first indication information, and the first indication information indicates a condition for sending the information about the second policy control network element.

19 Claims, 9 Drawing Sheets

(56) References Cited

U.S. PATENT DOCUMENTS

| | | | | |
|---|---|---|---|---|
| 2024/0244414 | A1* | 7/2024 | Zhao | H04L 69/40 |
| 2024/0365088 | A1* | 10/2024 | Hong | H04W 8/18 |

OTHER PUBLICATIONS

3rd Generation Partnership Project;Technical Specification Group Core Network and Terminals;5G System; Binding Support Management Service;Stage 3(Release 16),3GPP TS 29.521 V16.8.0 (Jun. 2021),total:37pages.

3rd Generation Partnership Project;Technical Specification Group Services and System Aspects;Procedures for the 5G System (5GS); Stage 2(Release 16),3GPP TS 23.502 V16.9.0 (Jun. 2021),total:614pages.

* cited by examiner

CONT. FROM FIG. 5A

CONT. FROM FIG. 5A

INFORMATION OBTAINING METHOD AND APPARATUS, AND SYSTEM

CROSS-REFERENCE TO RELATED APPLICATIONS

This application is a continuation of International Patent Application No. PCT/CN2022/097406, filed on Jun. 7, 2022, which claims priority to Chinese Patent Application No. 202110820760.7, filed on Jul. 20, 2021. The disclosures of the aforementioned applications are hereby incorporated by reference in their entireties.

TECHNICAL FIELD

This application relates to the field of communication technologies, and in particular, to an information obtaining method and apparatus, and a system.

BACKGROUND

In some communication systems, for example, a 5th generation (5G) communication system, after accessing a network, user equipment may create a plurality of protocol data unit (PDU) sessions to same single network slice selection assistance information (S-NSSAI) and a same data network name (DNN).

Currently, in a binding information subscription procedure of a policy control function for session management (SM PCF), a PDU session with same S-NSSAI and a same DNN of same user equipment triggers registration and deregistration of binding information of the SM PCF for a plurality of times. This causes unnecessary signaling overheads.

SUMMARY

This application provides an information obtaining method and apparatus, to reduce signaling overheads in an information obtaining procedure of a PCF.

According to a first aspect, an information obtaining method is provided. The method may be performed by a first policy control network element, or may be performed by a chip, a chip system, or a circuit in the first policy control network element. This is not limited in this application. For ease of description, the following uses an example in which the method is performed by the first policy control network element for description.

The method includes the following steps:

The first policy control network element receives first information of user equipment from an application function network element, where the first information is for deciding a mobility management policy, the first information includes session information of the user equipment, and the first policy control network element is a network element that decides the mobility management policy. The first policy control network element sends, to a binding support function network element, a message for obtaining information about a second policy control network element, where the second policy control network element is a policy control network element that serves a session corresponding to the session information, the message for obtaining the information about the second policy control network element includes the session information and first indication information, and the first indication information indicates a condition for sending the information about the second policy control network element.

Based on the foregoing technical solution, the first policy control network element includes the first indication information in the message for obtaining the information about the second policy control network element that is to be sent to the binding support function network element, so that the binding support function network element sends the information about the second policy control network element to the first policy control network element only when the condition indicated by the first indication information is met. This avoids a case in which a plurality of sessions that are of same user equipment and that correspond to same session information trigger a notification of the information about the second policy control network element for a plurality of times, to reduce a quantity of times of delivering notification messages, and reduce signaling overheads.

With reference to the first aspect, in some implementations of the first aspect, the condition includes that binding information of a second policy control network element that serves a first session corresponding to the session information is registered, and the method further includes: When the binding information of the second policy control network element that serves the first session corresponding to the session information is registered, the first policy control network element receives the information about the second policy control network element from the binding support function network element, where the information about the second policy control network element includes registration indication information of the binding information of the second policy control network element that serves the first session.

For example, the foregoing condition includes that the first session corresponding to the session information is created (or the condition includes that the second policy control network element that serves the first session corresponding to the session information is registered with the binding support function network element or the binding information of the second policy control network element is registered with the binding support function network element); and the binding support function network element sends the registration indication information to the first policy control network element only when the first session corresponding to the session information is created (or the second policy control network element that serves the first session is registered with the binding support function network element or the binding information of the second policy control network element is registered with the binding support function network element). This avoids triggering the registration indication information of the policy control network element for a plurality of times when a plurality of sessions corresponding to the session information are separately created, to reduce a quantity of times of delivering the registration indication information, and reduce signaling overheads.

With reference to the first aspect, in some implementations of the first aspect, the condition includes that binding information of a second policy control network element that serves a last session corresponding to the session information is deregistered, and the method further includes: When the binding information of the second policy control network element that serves the last session is deregistered, the first policy control network element receives the information about the second policy control network element from the binding support function network element, where the information about the second policy control network element includes deregistration indication information.

For example, the foregoing condition is that the last session corresponding to the session information is terminated (or the condition includes that the second policy control network element that serves the last session is deregistered from the binding support function network element or the binding information of the second policy control network element is deregistered from the binding support function network element); and the binding support function network element sends the deregistration indication information to the first policy control network element only when the last session corresponding to the session information is terminated (or the second policy control network element that serves the last session is deregistered from the binding support function network element or the binding information of the second policy control network element is deregistered from the binding support function network element). This avoids triggering the deregistration indication information of the policy control network element for a plurality of times when a plurality of sessions corresponding to the session information are separately terminated, to reduce a quantity of times of delivering the deregistration indication information, and reduce signaling overheads.

With reference to the first aspect, in some implementations of the first aspect, the first information further includes an application identifier, and the condition is that binding information of the second policy control network element is registered, and the method further includes: When the binding information of the second policy control network element is registered, the first policy control network element receives the information about the second policy control network element from the binding support function network element, where the information about the second policy control network element includes an identifier of the second policy control network element.

For example, when the first information includes the application identifier, the foregoing condition is that any session corresponding to the session information is created (or the condition includes that the second policy control network element that serves the session corresponding to the session information is registered with the binding support function network element or the binding information of the second policy control network element is registered with the binding support function network element); and the binding support function network element sends the identifier of the second policy control network element to the first policy control network element only when any session corresponding to the session information is created (or the second policy control network element is registered with the binding support function network element or the binding information of the second policy control network element is registered with the binding support function network element), and does not need to send deregistration indication information of the second policy control network element when the session is terminated. This avoids triggering the deregistration indication information of the policy control network element for a plurality of times when a plurality of sessions corresponding to the session information are separately terminated, to reduce a quantity of times of delivering the deregistration indication information, and reduce signaling overheads.

With reference to the first aspect, in some implementations of the first aspect, the method further includes: The first policy control network element receives session termination indication information from the second policy control network element; and the first policy control network element updates the mobility management policy based on the session termination indication information. With reference to the first aspect, in some implementations of the first aspect, the first indication information is indication information for requesting a status of the session corresponding to the session information; the first indication information is indication information for requesting a registration status of the binding information of the second policy control network element; the first indication information is an identifier of an event that the binding information is registered and an identifier of an event that the binding information is deregistered; or the first indication information is the condition.

Based on the foregoing technical solution, the first indication information may directly or indirectly indicate the foregoing condition for sending the information about the second policy control network element, to increase flexibility of the solution.

With reference to the first aspect, in some implementations of the first aspect, the session information is single network slice selection assistance information S-NSSAI and a data network name DNN.

With reference to the first aspect, in some implementations of the first aspect, the first information further includes service area coverage information and/or high throughput indication information, and the service area coverage information and/or the high throughput indication information are/is for deciding the mobility management policy of the session corresponding to the session information.

With reference to the first aspect, in some implementations of the first aspect, the message for obtaining the information about the second policy control network element is a management subscription request message.

According to a second aspect, an information obtaining method is provided. The method may be performed by a first policy control network element, or may be performed by a chip, a chip system, or a circuit in the first policy control network element. This is not limited in this application. For ease of description, the following uses an example in which the method is performed by the first policy control network element for description.

The method includes the following steps:

The first policy control network element receives first information of user equipment from an application function network element, where the first information is for deciding a mobility management policy, the first information includes an application identifier, and the first policy control network element is a network element that decides the mobility management policy. The first policy control network element sends, to a binding support function network element, a message for obtaining information about a second policy control network element, where the second policy control network element is a policy control network element that serves a session, the session is a session for the user equipment to access an application, the message includes session information of the session and first indication information, the first indication information indicates a condition for sending the information about the second policy control network element, and the condition is that binding information of the second policy control network element is registered.

Based on the foregoing technical solution, the first policy control network element includes the first indication information in the message for obtaining the information about the second policy control network element that is to be sent to the binding support function network element, so that the binding support function network element sends the information about the second policy control network element to the first policy control network element only when the condition indicated by the first indication information is met. This avoids a case in which a plurality of sessions that are of same user equipment and that correspond to same session information trigger a notification of the information about the second policy control network element for a plurality of times, to reduce a quantity of times of delivering notification messages, and reduce signaling overheads.

With reference to the second aspect, in some implementations of the second aspect, the method further includes: When the binding information of the second policy control network element is registered, the first policy control network element receives the information about the second policy control network element from the binding support function network element, where the information about the second policy control network element includes an identifier of the second policy control network element.

For example, the foregoing condition is that any session corresponding to the session information is created (or the condition includes that the second policy control network element that serves the session corresponding to the session information is registered with the binding support function network element, or the binding information of the second policy control network element is registered with the binding support function network element); and the binding support function network element sends the identifier of the second policy control network element to the first policy control network element only when any session corresponding to the session information is created (or when the second policy control network element is registered with the binding support function network element or the binding information of the second policy control network element is registered with the binding support function network element), and does not need to send deregistration indication information of the policy control network element when the session is terminated. This avoids triggering the deregistration indication information of the policy control network element for a plurality of times when a plurality of sessions corresponding to the session information are separately terminated, to reduce a quantity of times of delivering the deregistration indication information, and reduce signaling overheads.

With reference to the second aspect, in some implementations of the second aspect, the method further includes: The first policy control network element determines the session information based on the application identifier.

With reference to the second aspect, in some implementations of the second aspect, the first indication information is indication information for requesting a status of the application; the first indication information is an identifier of an event that the binding information is registered; or the first indication information is the condition.

Based on the foregoing technical solution, the first indication information may directly or indirectly indicate the foregoing condition for sending the information about the second policy control network element, to increase flexibility of the solution.

With reference to the second aspect, in some implementations of the second aspect, the first information further includes service area coverage information and/or high throughput indication information, and the service area coverage information and/or the high throughput indication information are/is for deciding the mobility management policy of the session corresponding to the session information.

With reference to the second aspect, in some implementations of the second aspect, the message for obtaining the information about the second policy control network element is a management subscription request message.

According to a third aspect, an information obtaining apparatus is provided. The apparatus may be a first policy control network element, or may be a chip in the first policy control network element. The apparatus has a function of implementing any implementation method in the first aspect or the second aspect. The function may be implemented by hardware, or may be implemented by hardware by executing corresponding software. The hardware or the software includes one or more modules corresponding to the function.

According to a fourth aspect, a data obtaining apparatus is provided. The data obtaining apparatus includes a processor, configured to implement a function of the first policy control network element in the method described in the first aspect or the second aspect.

In a possible implementation, the data obtaining apparatus may further include a memory, the memory is coupled to the processor, and the processor is configured to implement the function of the first policy control network element in the method described in the first aspect or the second aspect.

In a possible implementation, the memory is configured to store program instructions and data. The memory is coupled to the processor. The processor may invoke and execute the program instructions stored in the memory, to implement the function of the first policy control network element in the method described in the first aspect or the second aspect.

In a possible implementation, the data obtaining apparatus may further include a communication interface, and the communication interface is used by the data obtaining apparatus to communicate with another device. The communication interface may be a transceiver, an input/output interface, a circuit, or the like.

In a possible design, the data obtaining apparatus includes a processor and a communication interface. The processor is configured to run a computer program, to enable the data obtaining apparatus to implement any method described in the first aspect or the second aspect. The processor communicates with an external device through the communication interface. It may be understood that the external device may be an object other than the processor or an object other than the apparatus.

In another possible design, the data obtaining apparatus is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

According to a fifth aspect, this application provides a computer-readable storage medium. The computer-readable storage medium stores instructions, and when the instructions are run on a computer, the computer is enabled to perform the methods in the foregoing aspects.

According to a sixth aspect, this application provides a computer program product including instructions, and when the computer program product runs on a computer, the computer is enabled to perform the methods in the foregoing aspects.

According to a seventh aspect, a communication system is provided. The communication system includes the first policy control network element, the application function network element that communicates with the first policy control network element, and the binding support function network element in the first aspect.

According to an eighth aspect, a communication system is provided. The communication system includes the first policy control network element, the application function network element that communicates with the first policy control network element, and the binding support function network element in the second aspect.

According to a ninth aspect, a chip or a chip system is provided. The chip or the chip system includes at least one processor and a communication interface. The communication interface and the at least one processor are interconnected through a line. The at least one processor is configured to run a computer program or instructions, to perform the method in any one of the possible implementations of the first aspect and the second aspect. The communication interface in the chip may be an input/output interface, a pin, a circuit, or the like.

In a possible implementation, the chip or the chip system described in this application further includes at least one memory, and the at least one memory stores instructions. The memory may be a storage unit in the chip, for example, a register or a cache, or may be a storage unit (for example, a read-only memory or a random access memory) of the chip.

Figure 2:
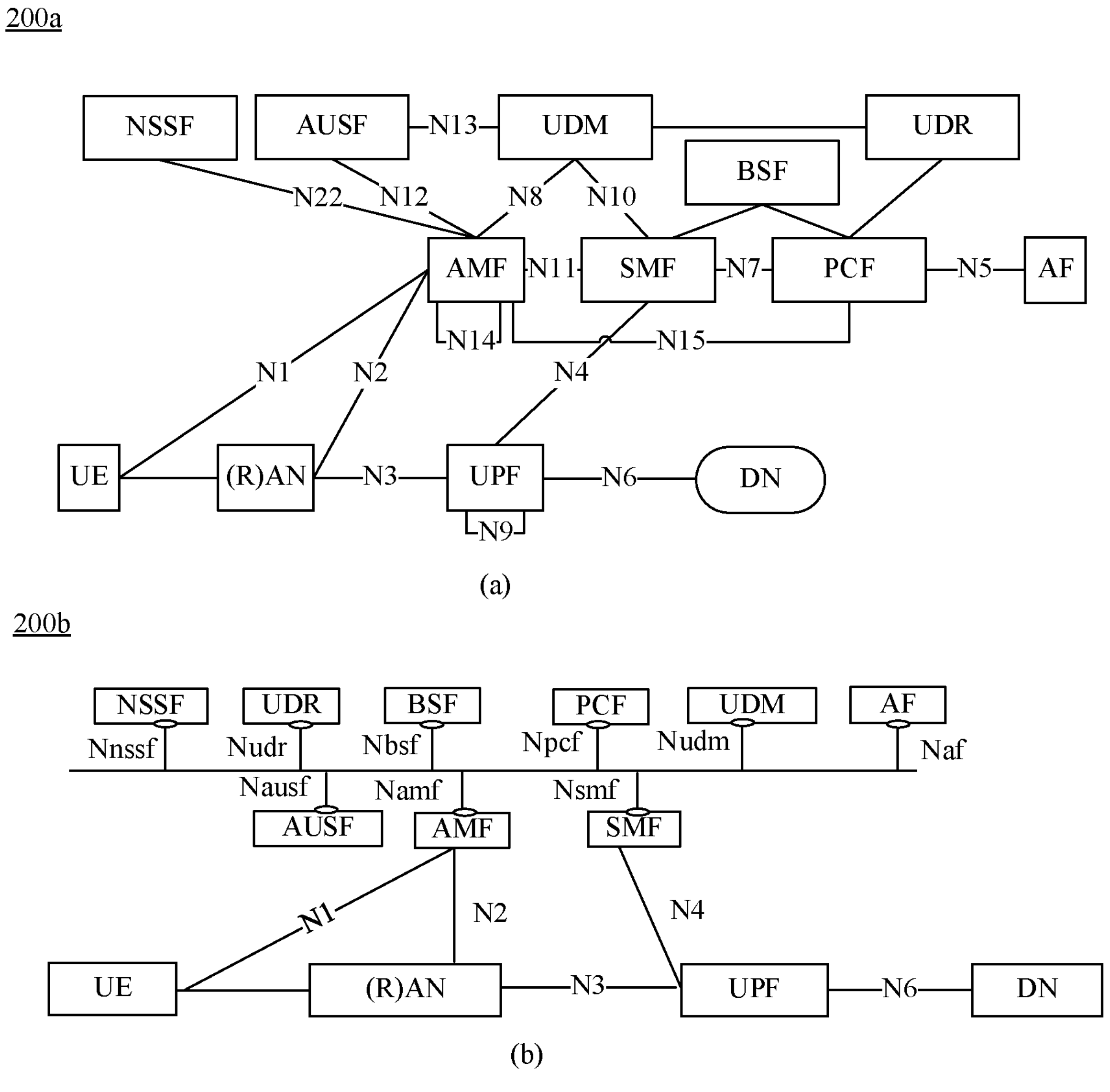
Figure 3:
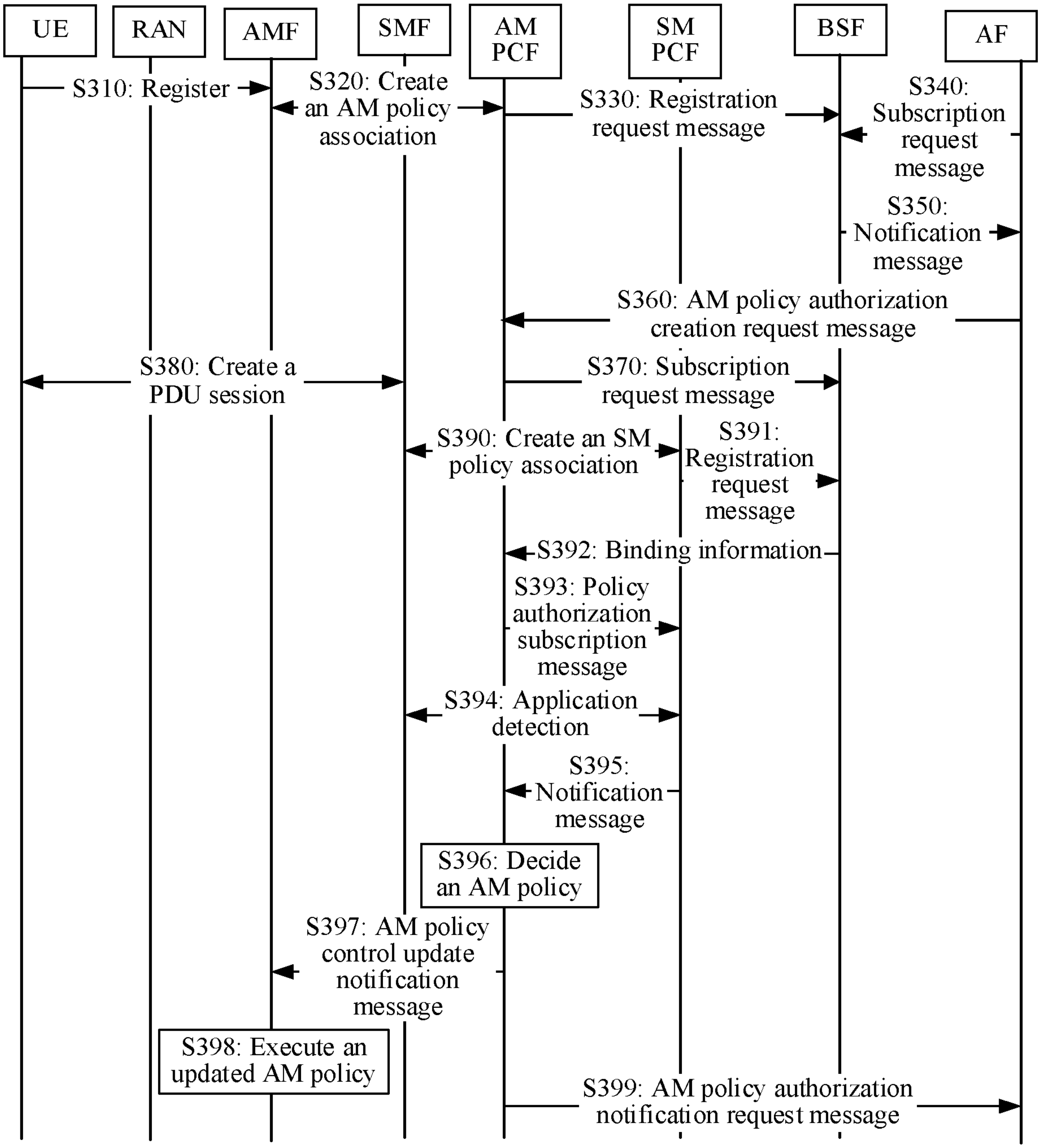
Figure 4:
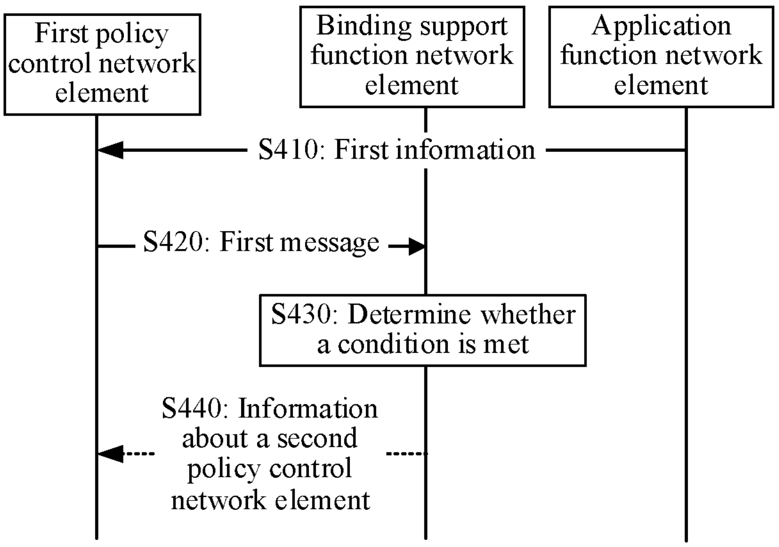
Figure 5A:
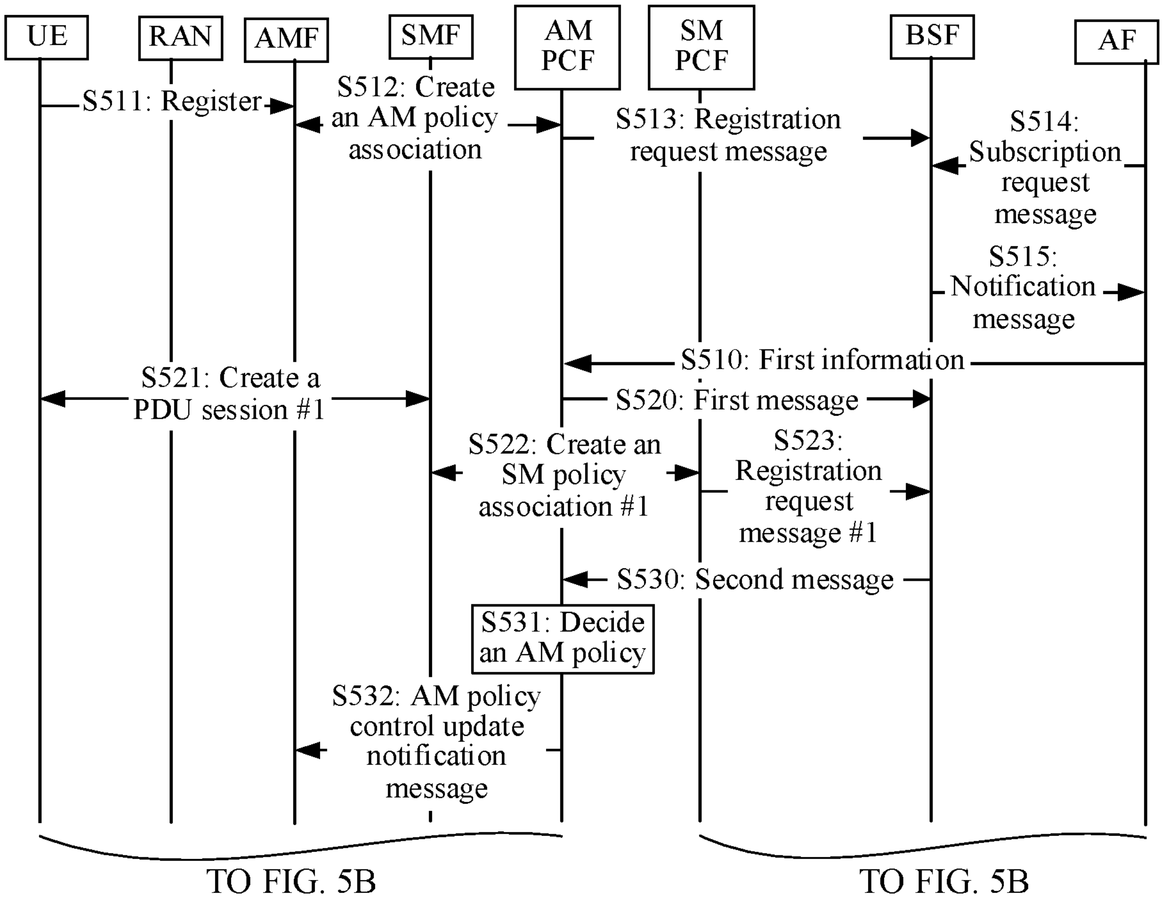
Figure 5B:
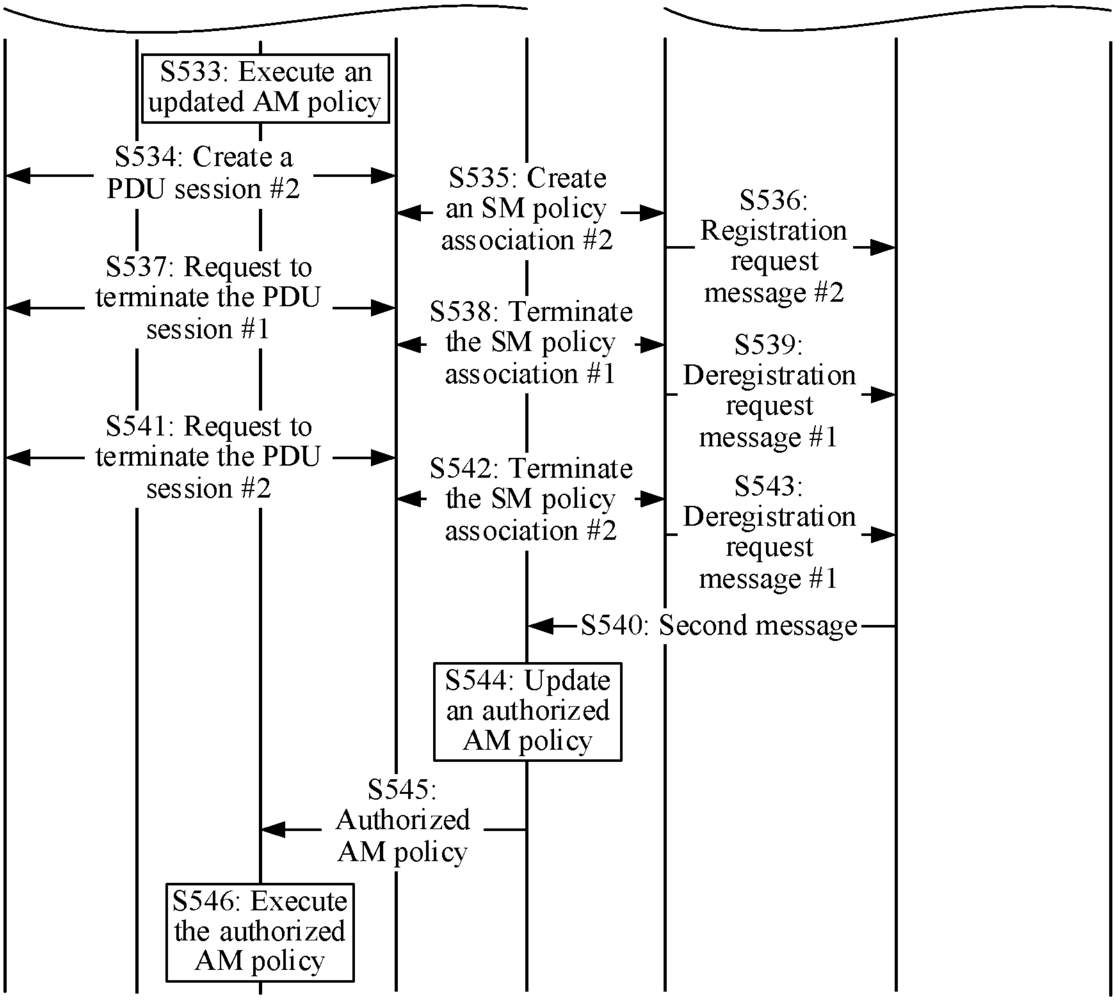
Figure 6A:
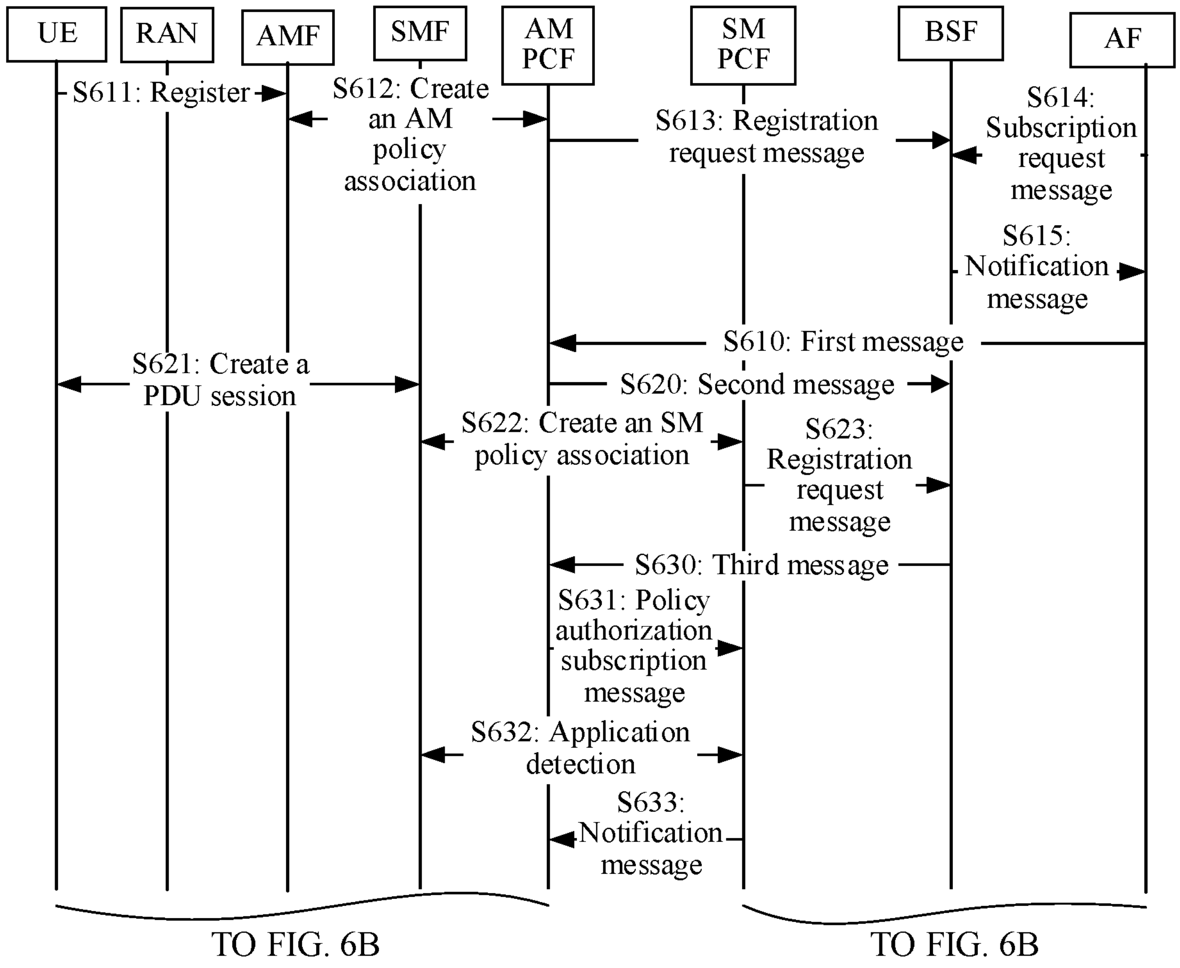
Figure 6B:
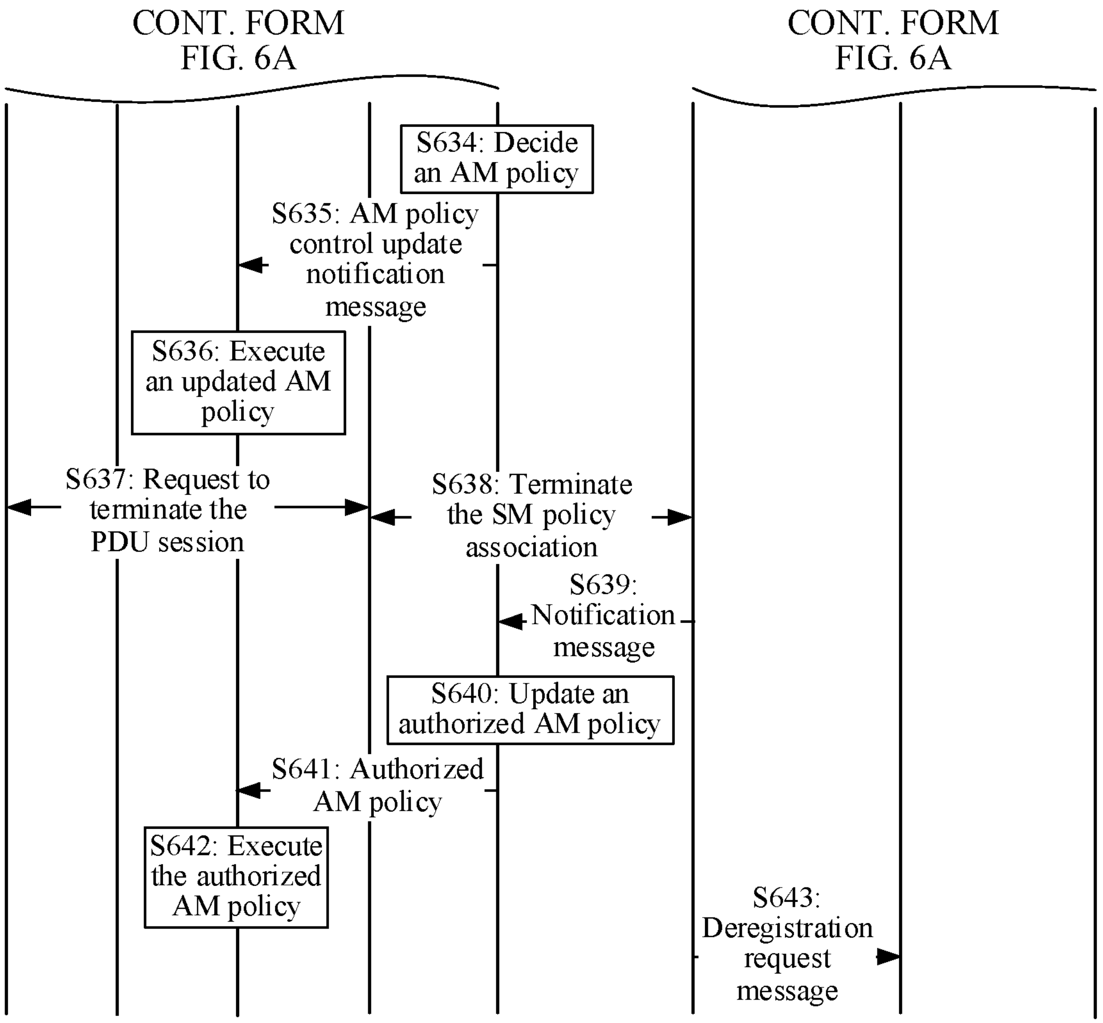
Figure 7:
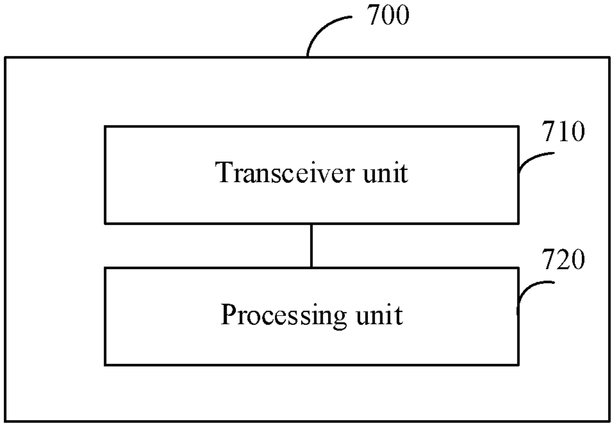
Figure 8:
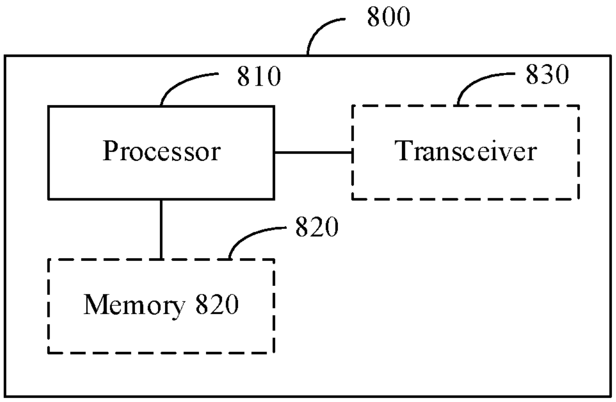
Figure 9:
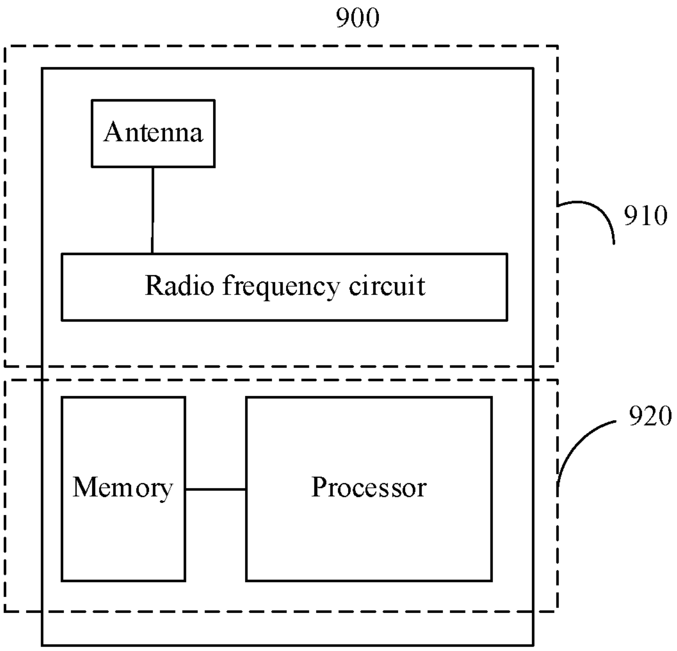

(a) and (b) in FIG. 2 are schematic architectural diagrams of 5G systems to which embodiments of this application are applicable;

FIG. 3 is a schematic flowchart of an AM policy deciding method;

FIG. 4 is a schematic flowchart of an information obtaining method according to an embodiment of this application;

FIG. 5A and FIG. 5B show an AM policy deciding procedure according to an embodiment of this application;

FIG. 6A and FIG. 6B show another AM policy deciding procedure according to an embodiment of this application;

FIG. 7 is a schematic block diagram of a communication apparatus according to an embodiment of this application;

FIG. 8 is another schematic block diagram of a communication apparatus according to an embodiment of this application; and FIG. 9 is a schematic diagram of a structure of a communication apparatus according to an embodiment of this application.

DETAILED DESCRIPTION OF ILLUSTRATIVE EMBODIMENTS

The following describes the technical solutions of this application with reference to the accompanying drawings.

The technical solutions in embodiments of this application may be applied to various communication systems, for example, a 5th generation (5G) system, a new radio (NR) system, a long term evolution (LTE) system, an LTE frequency division duplex (FDD) system, or an LTE time division duplex (TDD) system. The technical solutions provided in this application may be further applied to a future communication system, for example, a 6th generation mobile communication system. The technical solutions in embodiments of this application may be further applied to device-to-device (D2D) communication, vehicle-to-everything (V2X) communication, machine-to-machine (M2M) communication, machine type communication (MTC), and an internet of things (IoT) communication system, or another communication system.

For ease of understanding of embodiments of this application, a communication system to which embodiments of this application are applicable is first briefly described with reference to FIG. 1.

Figure 1:
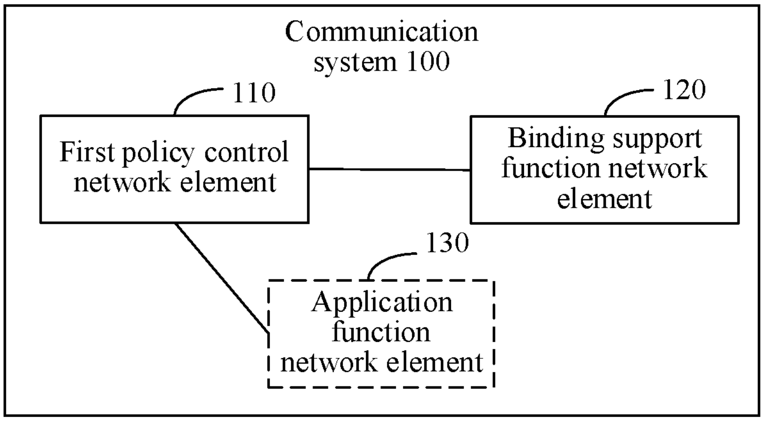
FIG. 1 is a schematic diagram of a communication system according to this application.

FIG. 1 is a schematic diagram of a communication system according to this application. As shown in FIG. 1, the system includes a first policy control network element 110 and a binding support function network element 120. Optionally, the system 100 may further include an application function network element 130. The system 100 may be configured to perform an information obtaining method in embodiments of this application.

The first policy control network element 110 is configured to receive first information of user equipment from the application function network element 130, where the first information is for deciding a mobility management policy, the first information includes session information of the user equipment, or the first information includes an application identifier, and the first policy control network element is a network element that decides the mobility management policy; and is further configured to send, to the binding support function network element 120, a message for obtaining information about a second policy control network element, where the second policy control network element is a policy control network element that serves a session corresponding to the session information (or the second policy control network element is a network element that provides a session management policy for a session corresponding to the session information), the message for obtaining the information about the second policy control network element includes the session information and first indication information, and the first indication information indicates a condition for sending the information about the second policy control network element.

The binding support function network element 120 is configured to receive, from the first policy control network element 110, the message for obtaining the information about the second policy control network element. When the foregoing condition is met, the binding support function network element 120 is further configured to send the information about the second policy control network element to the first policy control network element 110.

Optionally, the application function network element 130 is configured to send the first information to the first policy control network element 110.

For example, according to the communication system provided in this application, the binding support function network element 120 sends the information about the second policy control network element to the first policy control network element 110 only when the condition is met. Because of the condition for limiting sending the information about the second policy control network element, unnecessary signaling overheads are avoided.

The system 100 shown in FIG. 1 may be used in a 5th generation (5G) network architecture shown in (a) in FIG. 2 and/or (b) in FIG. 2, and certainly may also be used in a future network architecture, for example, a 6th generation (6G) network architecture. This is not specifically limited in embodiments of this application.

For example, it is assumed that the communication system shown in FIG. 1 is used in a 5G network shown in (a) in FIG. 2 and/or (b) in FIG. 2. The first policy control network element may be a mobility management policy control network element (policy control function for access and mobility control (AM PCF)) in 5G, the second policy control network element may be a policy control function for session management (policy control function for session management, SM PCF) in 5G, the binding support function network element may be a binding support function (binding support function, BSF) network element in 5G, and the application function network element may be an application function (application function, AF) network element in 5G.

With reference to (a) in FIG. 2 and (b) in FIG. 2, the following uses examples to describe 5G systems to which embodiments of this application are applicable. It should be understood that the 5G system described in this specification is merely an example, and should not constitute any limitation on this application.

It should be further understood that some network elements in the 5G system may communicate with each other through a service-based interface or a point-to-point interface. The following separately describes a 5G system framework based on a point-to-point interface and a 5G system framework based on a service-based interface with reference to (a) in FIG. 2 and (b) in FIG. 2.

For example, (a) in FIG. 2 is a schematic architectural diagram of a 5G system 200*a* to which an embodiment of this application is applicable. (a) in FIG. 2 is a schematic diagram of a 5G network architecture based on the point-to-point interface. As shown in (a) in FIG. 2, the network architecture may include but is not limited to the following network elements (also referred to as function network elements, function entities, nodes, devices, or the like): a (radio) access network device ((R)AN), an access and mobility management function (AMF) network element, a session management function (SMF) network element, a user plane function (UPF) network element, a policy control function (PCF) network element, a unified data management (UDM) network element, an AF network element, a data network (DN), a network slice selection function (NSSF), an authentication server function (AUSF), a unified data management (UDM), a BSF network element, a unified data repository (UDR), and the like.

The following briefly describes the network elements shown in (a) in FIG. 2.

1. A terminal communicating with the (R)AN may also be referred to as a terminal device (terminal equipment), user equipment (UE), an access terminal, a user unit, a user station, a mobile console, a mobile station (MS), a mobile terminal (MT), a remote station, a remote terminal, a mobile device, a user terminal, a terminal, a wireless communication device, a user agent, or a user apparatus. The terminal device may be a device that provides voice/data connectivity for a user, for example, a handheld device or a vehicle-mounted device having a wireless connection function. Currently, some examples of the terminal may be: a mobile phone, a tablet computer (pad), a computer (for example, a notebook computer or a palmtop computer) having a wireless transceiver function, a mobile internet device (MID), a virtual reality (VR) device, an augmented reality (AR) device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, or a terminal device in a future evolved public land mobile network (PLMN).

In addition, the terminal device may alternatively be a terminal device in an internet of things (IoT) system. An IoT is an important part in future development of information technologies. A main technical feature of the IoT is to connect things to a network by using a communication technology, to implement an intelligent network for human-machine interconnection and thing-thing interconnection. IoT technologies can achieve massive connections, deep coverage, and power saving for terminals by using, for example, a narrow band (NB) technology.

In addition, the terminal device may further include sensors such as an intelligent printer, a train detector, and a gas station, and main functions include: collecting data (which is a function of some terminal devices), receiving control information and downlink data of a network device, sending an electromagnetic wave, and transmitting uplink data to the network device.

It should be understood that the terminal device may be any device that may access the network. The terminal device may communicate with the access network device by using an air interface technology.

Optionally, the user equipment may be used as a base station. For example, the user equipment may be used as a scheduling entity that provides a sidelink signal between user equipments in V2X or D2D. For example, a cellular phone and a car communicate with each other by using a sidelink signal. The cellular phone communicates with a smart home device without relaying a communication signal through a base station.

2. The (R)AN is configured to provide a network access function for authorized user equipment in a specific area, and can use transmission tunnels of different quality of service based on a level of the user equipment, a service requirement, and the like.

The (R)AN can manage radio resources and provide an access service for the user equipment, to forward a control signal and user equipment data between the user equipment and a core network. The (R)AN may also be understood as a base station in a conventional network.

For example, the access network device in embodiments of this application may be any communication device that has a wireless transceiver function and that is configured to communicate with the user equipment. The access network device includes but is not limited to an evolved NodeB (eNB), a radio network controller (RNC), a NodeB (NB), a base station controller (BSC), a base transceiver station (BTS), a home base station (for example, a home evolved NodeB (HeNB), or a home NodeB (HNB)), a baseband unit (BBU), an access point (AP) in a wireless fidelity (Wi-Fi) system, a wireless relay node, a wireless backhaul node, a transmission point (TP), a transmission reception point (TRP), or the like. Alternatively, the access network device may be a gNB or a transmission point (TRP or TP) in a 5G system such as an NR system, may be one antenna panel or a group of antenna panels (including a plurality of antenna panels) of a base station in a 5G system, or may be a network node, for example, a baseband unit (BBU) or a distributed unit (DU), that constitutes a gNB or a transmission point.

In some deployments, a gNB may include a central unit (CU) and a DU. The gNB may further include an active antenna unit (AAU). The CU performs some functions of the gNB, and the DU performs some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the access network device may be a device including one or more of a CU node, a DU node, or an AAU node. In addition, the CU may be classified into an access network device in an access network (RAN), or the CU may be classified into an access network device in a core network (CN). This is not limited in this application.

3. The UPF network element mainly includes the following functions: functions related to a user plane, for example, data packet routing and transmission, packet detection, service usage reporting, quality of service (QoS) processing, lawful interception, uplink packet detection, and downlink data packet storage.

For example, UPFs may be classified into a packet data unit session anchor (PSA) UPF (PSA UPF) and an uplink (UL) classifier function (CL) UPF (UL CL UPF).

The PSA UPF is a UPF that supports a PDU session anchor function, and the UL CL UPF is a UPF that has an uplink classifier function. The UE is connected to the AMF through an N1 interface. The AN is connected to the AMF through an N2 interface, and is connected to the UL CL UPF through an N3 interface. The AMF is connected to the SMF through an N11 interface. The UL CL UPF is connected to the SMF through an N4 interface and is connected to the PSA UPF through an N9 interface. The SMF is connected to the PSA UPF through the N4 interface. The PSA UPF is connected to the DN through an N6 interface. The UL CL UPF is connected to the DN through the N6 interface.

4. The DN is a network for data transmission.

5. The AMF network element mainly includes the following access and mobility related functions, for example, connection management, mobility management, registration management, access authentication and authorization, reachability management, and security context management.

6. The SMF is mainly configured to manage a session, allocate and manage an internet protocol (IP) address of a terminal device, select an endpoint that can manage a user plane function interface and a policy control and charging function interface, notify downlink data, and so on.

For example, SMFs may be classified into an intermediate SMF (I-SMF) and an anchor SMF (A-SMF).

Based on different roles of the UPF, a UPF that interfaces with the A-SMF is referred to as a PSA UPF (or an anchor UPF), a UPF that interfaces with the I-SMF includes a UL CL UPF and a local PSA UPF, and the local PSA UPF and the UL CL UPF can be co-located. The PSA UPF and the local PSA UPF are separately interconnected to the DN through the N6 interface. The local PSA UPF and the DN connected to the local PSA UPF are closer to an access point of the UE. The UE is connected to the AMF through the N1 interface, and the RAN is connected to the AMF through the N2 interface, and is connected, through the N3 interface, to the UPF controlled by the I-SMF. UPFs are connected through the N9 interface. The SMF controls the UPF through the N4 interface. The AMF is connected to the I-SMF through the N11 interface. The I-SMF is connected to the A-SMF through an Nxx interface (the Nxx interface may be named in another manner below, and this is not limited in this application). The AMF and the A-SMF obtain user subscription data from the UDM through an N8 interface and an N10 interface respectively, and obtain policy data from the PCF through an N15 interface and an N7 interface respectively.

7. The PCF is configured to guide a unified policy framework of network behavior, provide policy rule information for a control plane function network element (for example, the AMF network element or the SMF network element), and so on.

For example, the PCF may be an AM PCF in a 5G communication system architecture, or may be an SM PCF in a 5G communication system architecture.

In this embodiment of this application, PCFs connected to the AMF and the SMF respectively correspond to the AM PCF and the SM PCF. In an actual deployment scenario, the PCFs may be a same PCF entity, or may be two different PCF entities.

8. The UDM may be understood as a name of a unified data management network element in the 5G architecture. The unified data management network element mainly includes the following functions: unified data management, authentication credential processing in a 3GPP authentication and key agreement mechanism, user identity processing, access authorization, registration and mobility management, subscription management, SMS message management, and the like.

9. The AF is configured to provide application layer information, and may interact with a policy framework through a network exposure function network element, or directly interact with a policy framework to request policy deciding, and so on.

10. The NSSF mainly includes the following functions: selecting a group of network slice instances for the UE, determining allowed network slice selection assistance information (NSSAI), determining an AMF set that can serve the UE, and the like.

11. The AUSF mainly includes the following functions: an authentication server function, interacting with the unified data management network element to obtain user information, and performing an authentication related function, for example, generating an intermediate key.

12. The BSF implements session binding. Specifically, the BSF is configured to address the PCF by the AF.

When the SMF requests policy control from the PCF for a session that the UE requests to create, the SMF provides information such as a UE identifier and a user IP address for the PCF. The PCF registers binding information (including but not limited to the UE identifier, the user IP address, and a selected PCF identifier) with the BSF. Then, when the UE accesses a service on the AF by using the session, the AF may need to request policy authorization from the PCF for the service accessed by the UE. The PCF selected by the AF for the policy authorization needs to be consistent with the PCF selected by the SMF for the session, because the policy authorization usually triggers the PCF to adjust policy control for an associated session of the SMF. The AF may query the BSF for a corresponding PCF based on the user IP address or the UE identifier, and then directly request policy authorization from the AF through a 5G-defined N5 interface.

13. The UDR is mainly configured to implement a function of accessing subscription data, policy data, application data, and another type of data.

It may be understood that the foregoing network element or function network element may be a network element in a hardware device, may be a software function running on dedicated hardware, or may be a virtualized function instantiated on a platform (for example, a cloud platform).

It can be learned from (a) in FIG. 2 that the interfaces between the control plane network elements in (a) in FIG. 2 are point-to-point interfaces.

In the architecture shown in (a) in FIG. 2, names and functions of the interfaces between the network elements are as follows:

(1) N1 represents an interface between the AMF and the terminal, and may be configured to transmit a QoS control rule and the like to the terminal.

(2) N2 represents an interface between the AMF and the RAN, and may be configured to transmit radio bearer control information and the like from a core network side to the RAN.

(3) N3 represents an interface between the RAN and the UPF, and is mainly configured to transmit uplink and downlink user plane data between the RAN and the UPF.

(4) N4 represents an interface between the SMF and the UPF, and may be configured to transmit information between a control plane and the user plane, including delivery of a forwarding rule, a QoS control rule, a traffic statistics rule, and the like from the control plane to the user plane, and reporting of user plane information.

(5) N5 represents an interface between the AF and the PCF, and may be configured to deliver an application service request and report a network event.

(6) N6 represents an interface between the UPF and the DN, and is configured to transmit uplink and downlink user data flows between the UPF and the DN.

(7) N7 represents an interface between the PCF and the SMF, and may be configured to deliver a protocol data unit (PDU) session granularity control policy and a service data flow granularity control policy.

(8) N8 represents an interface between the AMF and the UDM, and may be configured to obtain, by the AMF from the UDM, subscription data and authentication data that are related to access and mobility management, and configured to register, by the AMF, current mobility management related information of the terminal with the UDM, and so on.

(9) N9 represents a user plane interface between UPFs, and is configured to transmit uplink and downlink user data flows between the UPFs.

(10) N10 represents an interface between the SMF and the UDM, and may be configured to obtain, by the SMF from the UDM, subscription data related to session management, and configured to register, by the SMF, current session related information of the terminal with the UDM, and so on.

(11) N11 represents an interface between the SMF and the AMF, and may be configured to transmit PDU session tunnel information between the RAN and the UPF, transmit a control message to be sent to the terminal, transmit radio resource control information to be sent to the RAN, and so on.

(12) N12 represents an interface between the AMF and the AUSF, and may be configured to initiate, by the AMF, an authentication process to the AUSF, where an SUCI may be carried as a subscription identifier.

(13) N13 represents an interface between the UDM and the AUSF, and may be configured to obtain, by the AUSF, a user authentication vector from the UDM, to perform an authentication procedure.

For example, (b) in FIG. 2 is a schematic architectural diagram of a 5G system 200*b* to which an embodiment of this application is applicable. (b) in FIG. 2 is a schematic diagram of a 5G network architecture based on the service-based interface. As shown in (b) in FIG. 2, the network architecture may include but is not limited to the following network elements (also referred to as function network elements, function entities, nodes, devices, or the like):

a (R)AN, an AMF network element, an SMF network element, a UPF network element, a PCF network element, a UDM network element, an AF network element, a DN, an NSSF, an AUSF, a UDM, a BSF network element, a UDR, and the like.

For descriptions of functions of the network elements, refer to the descriptions of the functions of the corresponding network elements in (b) in FIG. 2. Details are not described again. A main difference between (b) in FIG. 2 and (a) in FIG. 2 lies in that interfaces between control plane network elements in (b) in FIG. 2 are service-based interfaces, and the interfaces between the control plane network elements in (a) in FIG. 2 are the point-to-point interfaces.

Nnssf, Nudr, Nausf, Nbsf, Namf, Npcf, Nsmf, Nudm and Naf in (b) in FIG. 2 are respectively service-based interfaces provided by the NSSF, the UDR, the AUSF, the BSF, the AMF, the PCF, the SMF, the UDM, and the AF, and are configured to invoke corresponding service-based operations. N1, N2, N3, N4, and N6 are interface sequence numbers. For meanings of these interface sequence numbers, refer to meanings defined in a 3rd Generation Partnership Project (3GPP) standard protocol. This is not limited herein.

It should be understood that the foregoing network architecture to which embodiments of this application can be applied is merely an example for description, and a network architecture to which embodiments of this application are applicable is not limited thereto. Embodiments of this application are applicable to any network architecture that can implement the functions of the foregoing network elements.

It should be further understood that the AMF, the SMF, the UPF, the PCF, the UDM, and the like shown in (a) in FIG. 2 or (b) in FIG. 2 may be understood as network elements configured to implement different functions, for example, may be combined into a network slice as required. These network elements may be independent devices, may be integrated into a same device to implement different functions, may be network elements in a hardware device, may be software functions running on dedicated hardware, or may be virtualized functions instantiated on a platform (for example, a cloud platform). A specific form of the foregoing network elements is not limited in this application.

It should be further understood that the foregoing names are defined merely for distinguishing between different functions, and should not constitute any limitation on this application. This application does not exclude a possibility of using other names in the 5G network and another future network. For example, in a 6G network, some or all of the foregoing network elements may still use terms in 5G, or may use other names.

It should be further understood that the names of the interfaces between the network elements in (a) in FIG. 2 or (b) in FIG. 2 are merely examples. In a specific implementation, names of interfaces may be other names. This is not specifically limited in this application. In addition, names of messages (or signaling) transmitted between the foregoing network elements are merely examples, and do not constitute any limitation on functions of the messages.

Currently, based on the 5G communication system architecture shown in (a) in FIG. 2 or (b) in FIG. 2, when the UE is registered with the AMF, the AMF interacts with the AM PCF to establish an access and mobility management (AM) policy association (AM policy association). A procedure in which the AMF interacts with the AM PCF to establish the AM policy association specifically includes the following steps:

The AM PCF formulates an AM policy and provides the AM policy to the AMF for policy execution. The AM policy includes a service area restriction and a RAT/frequency selection priority (RFSP). The service area restriction indicates an area in which access of the UE is allowed or not allowed. The RFSP is used by the RAN to determine a radio resource management policy. Further, the AMF sends the service area restriction to the RAN and the UE, and the AMF sends the RFSP to the RAN.

The following briefly describes a current AM policy deciding method with reference to FIG. 3. FIG. 3 is a schematic flowchart of an AM policy deciding method. The method includes the following steps.

S310: UE is registered with an AMF.

A general UE registration procedure may be briefly described as follows: The UE sends a registration request to the AMF through a RAN, the AMF sends a request message to a specific UDM based on an identifier of the UE, to obtain subscription data of the UE, and the UDM may obtain the subscription data of the UE from a UDR after receiving the request message.

It should be understood that the registration procedure of the UE is not limited in this embodiment of this application. For details, refer to descriptions in a current related technology. Details are not described in this application. In addition, in this embodiment of this application, the subscription data of the UE mainly relates to a service area restriction and an RFSP to which the UE subscribes, and other subscription data of the UE is not described in detail in this application.

In addition, the AMF may further initiate an access management policy control creation request to an AM PCF, to obtain an AM policy. The AM PCF returns the AM policy to the AMF in this process. The AM PCF is configured to provide the AM policy for the UE, and may also be referred to as a PCF serving the UE (PCF for UE). A method procedure shown in FIG. 3 further includes the following steps:

S320: The AMF interacts with the AM PCF to establish an AM policy association.

Specifically, this step includes: The AMF sends an AM policy control creation request message (for example, may be an Npcf_AMPolicyControl_Create request) to the AM PCF. The AM policy control creation request message includes information such as the identifier of the UE and the service area restriction and the RFSP to which the UE subscribes. The AM PCF determines an AM policy based on the subscription data of the UE, a network policy, and the like. The AM policy includes an authorized service area restriction of the UE, an authorized RFSP, and the like. The network policy may be a policy configured by an operator on the AM PCF. The AM PCF sends an AM policy control creation response message (for example, may be an Npcf_AMPolicyControl_Create response) to the AMF. The AM policy control creation response message includes the AM policy.

S330: The AM PCF sends a registration request message to a BSF, or a BSF receives a registration request message from the AM PCF.

The registration request message (for example, may be an Nbsf_Management_Register request) is for registering the AM PCF with the BSF or registering binding information of the AM PCF with the BSF. The message includes the binding information of the AM PCF. The binding information of the AM PCF includes a PCF identifier #1 and the identifier of the UE.

For example, the PCF identifier #1 may be an FQDN or an IP endpoint for the PCF to support an AM policy authorization (for example, may be Npcf_AmPolicyAuthorization) service. The identifier of the UE may be an identifier that can indicate the UE, such as a subscription permanent identifier (SUPI) or a generic public subscribe identifier (GPSI).

S340: An AF sends a subscription request message to the BSF, or the BSF receives a subscription request message from an AF.

The subscription request message (for example, may be an Nbsf_Management_Subscribe request) carries the identifier of the UE, and the subscription request message is for subscribing to registration information of an AM PCF that serves the UE.

Optionally, S240 may be performed before S210.

S350: The BSF determines the registration information of the corresponding AM PCF based on the identifier of the UE, and sends a notification message to the AF, or the AF receives a notification message from the BSF.

The notification message (for example, may be an Nbsf_Management_Notify request) includes an identifier of the AM PCF, and the identifier of the AM PCF is for determining the corresponding AM PCF.

S360: The AF sends an AM policy authorization creation request message to the AM PCF, or the AM PCF receives an AM policy authorization creation request message from the AF.

The AM policy authorization creation request message (for example, may be an Npcf_AMPolicyAuthorization_Create request) includes the identifier of the UE.

Further, the AM policy authorization creation request message further includes service area coverage and/or a high throughput indication.

For example, when the authorization creation request message includes the service area coverage, the authorization creation request message further includes an application identifier (ID) associated with the service area coverage, or a combination of a DNN and S-NSSAI that are associated with the service area coverage.

For example, when the authorization creation request message includes the high throughput indication, the authorization creation request message further includes an application ID associated with the high throughput indication, or a combination of a DNN and S-NSSAI that are associated with the high throughput indication.

A combination of a DNN and S-NSSAI may be represented as a combination of (DNN, S-NSSAI), or may be represented as a combination of (S-NSSAI, DNN).

Optionally, the AF may further subscribe to a service area restriction change event.

Optionally, the AM PCF stores information and then returns an Npcf_AMPolicyAuthorization_Create response.

S370: The AM PCF sends a subscription request message to the BSF, or the BSF receives a subscription request message from the AM PCF.

The subscription request message (for example, may be an Nbsf_Management_Subscribe request) is for subscribing to binding information of an SM PCF, and the message carries the identifier of the UE and a combination of (DNN, S-NSSAI).

Further, after receiving the subscription request message, the BSF may return an acknowledgment message to the AM PCF, the BSF sends an acknowledgment message to the AM PCF, or the AM PCF receives an acknowledgment message from the BSF.

The acknowledgment message (for example, may be an Nbsf_Management_Subscribe acknowledge) is for acknowledging receiving of the subscription request message.

S380: The UE creates a PDU session.

The PDU session corresponds to the combination of (DNN, S-NSSAI). An SMF allocates a UE address to the PDU session.

A general PDU session creation procedure may be briefly described as follows: The UE sends a PDU session creation request to the AMF through the RAN. The AMF selects the SMF for the PDU session to serve the PDU session, stores a correspondence between the SMF and the PDU session, and sends the PDU session creation request to the SMF. The SMF selects a corresponding UPF for the UE, creates a user plane transmission path, and allocates an IP address to the UE. In this process, the SMF further initiates a session policy control creation request to the SM PCF, to create session policy control between the SMF and the SM PCF. In a session policy control creation process, the SMF stores a correspondence between the session policy control and the PDU session. In addition, the AF may further create an AF session with the SM PCF, and the SM PCF binds the AF session to an SM policy association. The SM PCF is configured to provide a session management policy for the PDU session, and is also referred to as a PCF serving a PDU session (PCF for a PDU session).

S390: The SMF interacts with the SM PCF to establish an SM policy association.

Specifically, this includes: The SMF sends an SM policy control creation request message (for example, may be an Npcf_SMPolicyControl_Create request) to the SM PCF. The message includes the identifier of the UE, the UE address, the DNN, the S-NSSAI, and the like.

If the SM PCF does not have the subscription data of the UE, the SM PCF interacts with the UDR to obtain the subscription data of the UE. The SM PCF determines an SM policy based on the subscription data of the UE, the network policy, and the like.

The SM PCF returns an SM policy control creation response message (for example, may be an Npcf_SMPolicyControl_Create response) to the SMF. The message includes the SM policy.

S391: The SM PCF sends a registration request message to the BSF.

The registration request message (for example, may be an Nbsf_Management_Register request) is for registering the SM PCF with the BSF or registering binding information of the SM PCF with the BSF. The message includes the binding information of the SM PCF. The binding information includes the UE address, the identifier of the UE, a PCF identifier #2, and the combination of (DNN, S-NSSAI). The PCF identifier #2 is an FQDN or an IP endpoint for the SM PCF to support the Npcf_PolicyAuthorization service.

Further, after receiving the registration request message, the BSF may return an acknowledgment message to the SM PCF, the BSF sends an acknowledgment message to the SM PCF, or the SM PCF receives an acknowledgment message from the BSF.

The acknowledgment message (for example, may be an Nbsf_Management_Register acknowledge) is for acknowledging receiving of the registration request message.

S392: The BSF sends the binding information of the SM PCF (for example, may be an Nbsf_Management_Notify request) to the AM PCF based on the subscription in S370.

Optionally, if the information provided in S360 includes the service area coverage and/or the high throughput indication and the application IDs/the application ID associated with the service area coverage and/or the high throughput indication, the method procedure shown in FIG. 3 further includes the following steps.

S393: The AM PCF sends a policy authorization subscription message to the SM PCF.

The AM PCF sends the message to the SM PCF based on the FQDN or the IP endpoint for the SM PCF to support the Npcf_PolicyAuthorization service obtained in S392. The message (for example, may be an Npcf_PolicyAuthorization_Subscribe request) includes an application ID, and is for subscribing to an application start/stop event.

S394: The SM PCF interacts with the SMF, to request to detect the application start/stop event corresponding to the application ID. Specifically, the SMF further interacts with the UPF, to request the UPF to detect the application start/stop event corresponding to the application ID.

S395: The SM PCF sends a notification message to the AM PCF.

If the SM PCF receives, from the SMF, a report that the application start event is detected, the SM PCF sends the notification message to the AM PCF. The message carries the detected application ID and application start event.

Optionally, if the information provided in S360 includes the service area coverage and/or the high throughput indication and the combination of (DNN, S-NSSAI) associated with the service area coverage and/or the high throughput indication, after the AM PCF receives the binding information of the SM PCF in S392, or if the information provided in S360 includes the service area coverage and/or the high throughput indication and the application IDs/the application ID associated with the service area coverage and/or the high throughput indication, and the application start event is received in S395, the method procedure shown in FIG. 3 further includes the following steps:

S396: The AM PCF decides an AM policy.

Specifically, the AM PCF updates the service area restriction based on the service area coverage, and updates the RFSP based on the high throughput indication.

S397: The AM PCF sends an AM policy control update notification request message (for example, may be an Npcf_AmPolicyControl_UpdateNotify request) to the AMF. The message includes an updated service area restriction and/or an updated RFSP.

S398: The AMF executes an updated AM policy.

Specifically, the AMF sends the updated service area restriction to the RAN and the UE, and the AMF sends the updated RFSP to the RAN.

Optionally, if the AF subscribes to the service area restriction change event in S360, the method procedure shown in FIG. 3 further includes the following step:

S399: The AM PCF sends an AM policy authorization notification request message (for example, may be an Npcf_AMPolicyAuthorization_Notify request) to the AF. The message is for notifying the updated service area restriction.

It can be learned from the procedure shown in FIG. 3 that, in the AM policy deciding procedure, the AM PCF subscribes to the binding information that is of the SM PCF and that corresponds to the combination of (DNN, S-NSSAI) from the BSF. Therefore, the AM PCF is notified when binding information that is of the SM PCF and that corresponds to a PDU session with a same combination of (DNN, S-NSSAI) of same UE is registered and deregistered. The PDU session with the same combination of (DNN, S-NSSAI) of the UE triggers registration and deregistration of the binding information of the SM PCF for a plurality of times. Notification messages for notifying registration and deregistration are not helpful for the AM PCF to decide the AM policy.

In addition, when the AM PCF needs to subscribe to the application start/stop event corresponding to the application ID from the SM PCF, an AF session is created between the AM PCF and the SM PCF. Therefore, when the PDU session is terminated, the SM PCF may notify the AM PCF that the PDU session corresponding to the AM PCF is terminated, and the AM PCF may learn that the binding information of the SM PCF corresponding to the PDU session is deregistered. In this case, if the BSF notifies the AM PCF that the binding information of the SM PCF is deregistered, unnecessary signaling overheads are caused.

To resolve the problem existing in the foregoing AM policy deciding method, this application provides an information obtaining method. When obtaining the information about the SM PCF, the AM PCF indicates a condition when the information about the SM PCF needs to be sent, to reduce unnecessary signaling overheads.

It should be understood that the method provided in embodiments of this application may be applied to a 5G communication system, for example, the communication system shown in (a) in FIG. 2 or (b) in FIG. 2. However, a scenario to which the method can be applied is not limited in embodiments of this application. For example, the method is also applicable to another network architecture including network elements that can implement corresponding functions.

To facilitate understanding of the technical solutions in embodiments of this application, before the solutions in embodiments of this application are described based on a 5G architecture, some terms or concepts in 5G that may be used in embodiments of this application are first briefly described.

1. PDU Session

The PDU session is an association between a terminal device and a DN, and is for providing a PDU connection service.

2. AM Policy

The AM policy is for assisting in UE access and mobility management. In this application, the AM policy is also referred to as a mobility management policy for short. In embodiments of this application, the AM policy mainly relates to an RFSP and a service area restriction.

The RFSP includes a radio access type (RAT) and a radio frequency selection priority (FSP). In embodiments of this application, the RAT and the FSP are referred to as an "RFSP" for short. The RFSP is used by a RAN to determine a radio resource management policy, and the service area restriction indicates an area in which access of UE is allowed or not allowed.

3. Combination of (DNN, S-NSSAI)

In embodiments of this application, the combination of (DNN, S-NSSAI) may be referred to as session information. Subscription information of each piece of S-NSSAI may include one default DNN and a plurality of DNNs. When the UE initiates a PDU session creation request, an AMF selects the default DNN for the S-NSSAI if subscription information of the UE includes the default DNN. If no default DNN exists, the AMF selects a locally configured DNN for the S-NSSAI.

In embodiments of this application, the combination of (DNN, S-NSSAI) may be understood as information added by the AMF to the PDU session request message after the AMF receives the PDU session request message, and different PDU sessions may have a same combination of (DNN, S-NSSAI). For the same combination of (DNN, S-NSSAI), a plurality of PDU sessions may be created.

4. AF Session

A main function of the AF session is to convert media information in a network into service data function information and send the service data function information to a PCF. The PCF is responsible for authorizing the service data function information, to perform policy control for a service. In embodiments of this application, the PCF binds the AF session to session policy control.

5. Binding Information

In embodiments of this application, binding information of an AM PCF and binding information of an SM PCF are mainly related, and may be collectively referred to as binding information of a PCF. The binding information may be understood as PCF-related information, for example, may be an identifier of the PCF, or may be an identifier of UE served by the PCF or other PCF-related information for the AM PCF. The binding information may alternatively be an identifier of UE of a PDU session served by the PCF, a DNN, S-NSSAI, or other PCF-related information for the SM PCF. The identifier of the PCF may include a fully qualified domain name (FQDN) of the PCF, an IP endpoint, or the like.

The foregoing describes, with reference to FIG. 1, (a) in FIG. 2, and (b) FIG. 2, scenarios to which embodiments of this application can be applied; briefly describes, with reference to FIG. 3, a disadvantage of the current AM policy deciding method; and further briefly describes the basic concepts in this application. The following describes in detail an information obtaining method provided in this application with reference to the accompanying drawings.

A specific structure of an execution body of the method provided in embodiments of this application is not specifically limited in embodiments of this application, provided that a program that records code of the method provided in embodiments of this application can be run to perform communication according to the method provided in embodiments of this application. For example, the execution body of the method provided in embodiments of this application may be a core network device, or may be a function module that is in the core network device and that can invoke the program and execute the program.

For ease of understanding of embodiments of this application, the following descriptions are provided.

First, in this application, the term "indicate" may be understood as "enable", and "enable" may include direct enabling and indirect enabling. When a piece of information is for enabling A, the following is included: The information directly enables A or indirectly enables A, but it does not necessarily indicate that the information carries A.

Information enabled by information is referred to as to-be-enabled information. In a specific implementation process, there are a plurality of manners of enabling the to-be-enabled information, for example, but not limited to, a manner of directly enabling the to-be-enabled information. For example, the to-be-enabled information or an index of the to-be-enabled information is enabled. Alternatively, the to-be-enabled information may be indirectly enabled by enabling other information, and there is an association relationship between the other information and the to-be-enabled information. Alternatively, only a part of the to-be-enabled information may be enabled, and the other part of the to-be-enabled information is known or agreed on in advance. For example, specific information may alternatively be enabled according to an arrangement sequence of each piece of information that is pre-agreed on (for example, stipulated in a protocol), to reduce enabling overheads to some extent. In addition, a common part of each piece of information may be further identified and enabled in a unified manner, to reduce enabling overheads caused by separately enabling same information.

Second, "first", "second", and various numerical numbers (for example, "#1" and "#2") shown in this application are merely for ease of description, and are for distinguishing between objects, but are not intended to limit the scope of embodiments of this application, for example, are for distinguishing between different messages, but are not for describing a particular order or sequence. It should be understood that the objects described in this way are interchangeable in an appropriate circumstance, so that a solution other than the solutions in embodiments of this application can be described.

Third, in this application, the term "pre-configuration" may include "pre-definition", for example, definition in a protocol. The "pre-definition" may be implemented by storing corresponding code or a table in a device (for example, the device includes each network element) in advance, or may be implemented in another manner that may indicate related information. A specific implementation of "pre-definition" is not limited in this application.

Fourth, the term "storage" in embodiments of this application may be storage in one or more memories. The one or more memories may be separately disposed, or may be integrated into an encoder or a decoder, a processor, or a communication apparatus. Alternatively, a part of the one or more memories may be separately disposed, and a part of the one or more memories are integrated into the decoder, the processor, or the communication apparatus. A type of the memory may be a storage medium in any form. This is not limited in this application.

Fifth, the term "protocol" in embodiments of this application may be a standard protocol in the communication field, for example, may include a 5G protocol, a new radio (NR) protocol, and a related protocol used for a future communication system. This is not limited in this application.

Without a loss of generality, the following describes in detail the information obtaining method provided in embodiments of this application by using interaction between network elements as an example.

FIG. 4 is a schematic flowchart of an information obtaining method according to an embodiment of this application. The following describes in detail the information obtaining method with reference to each step.

S410: An application function network element sends first information of user equipment to a first policy control network element, or a first policy control network element receives first information of user equipment from an application function network element.

The first information is for requesting to decide a mobility management policy, and the first policy control network element is a network element that decides the mobility management policy.

For example, deciding in this application may also be referred to as authorization, and the first information may be considered as application layer information.

In this embodiment, there are the following two possibilities for an information element included in the first information:

(1) The first information includes session information of the user equipment, and the session information is for identifying some sessions created by the user equipment.

For example, the session information is S-NSSAI and a DNN.

For example, the session information included in the first information is the DNN, and the first policy control network element may determine to obtain the S-NSSAI based on the DNN or preconfigured information.

It should be noted that a quantity of session information in this embodiment is not limited. For example, the session information may be a plurality of pieces of S-NSSAI and a plurality of DNNs (for example, the session information includes a combination #1 of (S-NSSAI, DNN) and a combination #2 of (S-NSSAI, DNN)).

(2) The first information includes an application identifier. The application identifier is for identifying an application provided by an application server corresponding to the application function network element. The first policy control network element may obtain, based on the application identifier, a status of the application identified by the application identifier. The application identifier may be information such as a name or a function of the application. The status of the application includes an application start or an application stop (application start or application stop). Optionally, when the application function network element provides the application identifier for the first policy control network element through a network exposure function (NEF) network element, the NEF may perform mapping from an external identifier to an internal identifier of the application.

It should be noted that, in this embodiment, the first information may further include both the session information of the user equipment and the application identifier.

Optionally, the first information in (1) and (2) may further include service area coverage information and/or high throughput indication information, and the service area coverage information and/or the high throughput indication information are/is for deciding a mobility management policy of a session corresponding to the foregoing session information.

Because the service area coverage information and/or the high throughput indication information are/is for deciding the mobility management policy of the session corresponding to the session information, this may be referred to as that the service area coverage information is associated with the session information, and/or the high throughput indication information is associated with the session information.

In a possible implementation, the application function network element may provide application layer information for a single user equipment to decide the mobility management policy. In this manner, the first information may further include an identifier of the user equipment.

For example, the identifier of the user equipment may be an identifier that can indicate the user equipment, such as an SUPI of the user equipment or a GPSI of the user equipment.

In another possible implementation, the application function network element may provide application layer information for a group of user equipments to decide the mobility management policy. In this manner, the first information may further include an identifier of a user equipment group to which the user equipment belongs.

For example, the identifier of the user equipment group may be an ID of the user equipment group.

In still another possible implementation, the application function network element may provide application layer information for any user equipment to decide the mobility management policy. In this manner, the first information may further include an indication of any user equipment.

For example, the indication of any user equipment may be indication information for indicating the user equipment.

For example, the first information may be that the application function network element invokes an Npcf_AMPolicyAuthorization_Create request service. In this embodiment of this application, a trigger condition and a sending manner of sending the first information by the application function network element to the first policy control network element are not limited. For details, refer to descriptions of sending an AM policy authorization creation request message by an AF to an AM PCF in a current AM policy deciding procedure (the procedure shown in FIG. 3). Details are not described again in this application.

In a procedure shown in FIG. 4, after receiving the first information, the first policy control network element needs to send, to a binding support function network element, a message for obtaining information about a second policy control network element. The message for obtaining the information about the second policy control network element may be referred to as a first message. The method procedure shown in FIG. 4 further includes the following step:

S420: The first policy control network element sends the first message to the binding support function network element, or the binding support function network element receives the first message from the first policy control network element.

The first message is for obtaining the information about the second policy control network element. The second policy control network element is a policy control network element that serves a session corresponding to the session information, or the second policy control network element is a network element that provides a session management policy for the session corresponding to the session information.

For example, the first message may be a management subscription request (for example, Nbsf_Management_Subscribe request) message.

The information about the second policy control network element in this embodiment of this application includes registration indication information of binding information of the second policy control network element at the binding support function network element, deregistration indication information of the binding information of the second policy control network element at the binding support function network element, and an identifier of the second policy control network element.

For example, the identifier of the second policy control network element may be an FQDN or an IP endpoint for the second policy control network element to support an Npcf_PolicyAuthorization service.

Binding information registered by the second policy control network element with the binding support function network element includes an address of the user equipment, the identifier of the user equipment, a DNN, S-NSSAI, the identifier of the second policy control network element, an instance identifier of the second policy control network element, an identifier of a set to which the second policy control network element belongs, a binding level, and the like. The address of the user equipment is an address allocated by a session management network element to the user equipment in a procedure of creating a session by the user equipment. The identifier of the second policy control network element is for identifying the second policy control network element.

It should be understood that there may be one or more policy control network elements that serve the session corresponding to the session information. There may be one or more pieces of binding information of the policy control network element that serves the session corresponding to the session information.

For example, there are a plurality of sessions corresponding to the session information, and network elements that serve different sessions are different.

For another example, there are a plurality of sessions corresponding to the session information, and network elements that serve different sessions are the same.

Specifically, the first message includes the session information and first indication information, and the first indication information indicates a condition for sending the information about the second policy control network element.

It should be noted that, if the session information included in the first information that is of the user equipment and that is received by the first policy control network element from the application function network element is a DNN, before sending the first message to the binding support function network element, the first policy control network element needs to determine S-NSSAI corresponding to the DNN. In other words, in this embodiment of this application, the session information included in the first information obtained by the first policy control network element from the application function network element may be the DNN, or the S-NSSAI and the DNN, and the session information included in the first message sent by the first policy control network element to the binding support function network element is the S-NSSAI and the DNN.

In addition, when the information element included in the first information is the case shown in (2) in S410 (that is, when the first information includes the application identifier but does not include the session information), the first policy control network element further needs to determine the session information before sending the first message to the binding support function network element.

For example, the first policy control network element may determine the session information based on the application identifier. For example, the application identifier and the session information meet a correspondence.

Optionally, the first message may further include the identifier of the user equipment.

In this embodiment, in correspondence to (1) and (2) in S410, the first indication information is specifically represented in the following manners:

Manner 1: In correspondence to (1), the first information includes the session information of the user equipment.

The first indication information may be that binding information of a policy control network element for a first session corresponding to the session information is registered. The condition for sending the information about the second policy control network element in Manner 1 includes that the binding information of the policy control network element that serves the first session corresponding to the session information is registered. When the first session corresponding to the session information is created, the binding information of the policy control network element that serves the first session corresponding to the session information is registered with the BSF. Therefore, the first indication information may be that the first session corresponding to the session information is created, and the condition for sending the information about the second policy control network element in Manner 1 may be that the first session corresponding to the session information is created.

Manner 2: In correspondence to (1), the first information includes the session information of the user equipment.

The first indication information may be that binding information of a policy control network element that serves a last session corresponding to the session information is deregistered. The condition for sending the information about the second policy control network element in Manner 2 includes that the binding information of the policy control network element that serves the last session corresponding to the session information is deregistered. When the last session corresponding to the session information is terminated, the binding information of the policy control network element that serves the last session corresponding to the session information is deregistered from the BSF. Therefore, the first indication information may be that the last session corresponding to the session information is terminated, and the condition for sending the information about the second policy control network element in Manner 2 may be that the last session corresponding to the session information is terminated.

Manner 3: In correspondence to (1), the first information includes the session information of the user equipment.

The first indication information may be indication information for requesting a registration status of the binding information of the policy control network element that serves the session corresponding to the session information. The indication information for requesting the registration status of the binding information indicates the condition for sending the information about the second policy control network element. The condition for sending the information about the second policy control network element in Manner 3 includes that binding information of a policy control network element that serves a first session corresponding to the session information is registered and binding information of a policy control network element that serves the last session corresponding to the session information is deregistered. Creation of the first session corresponds to the registration of the binding information of the policy control network element that serves the session, and termination of the last session corresponds to the deregistration of the binding information of the policy control network element that serves the session. Therefore, the first indication information may alternatively be considered as indication information for requesting a status of the session corresponding to the session information.

Manner 4: In correspondence to (1), the first information includes the session information of the user equipment.

The first indication information may be an identifier of an event that the binding information is registered and an identifier of an event that the binding information is deregistered, and the identifier of the event that the binding information is registered and the identifier of the event that the binding information is deregistered indicate the foregoing condition for sending the information about the second policy control network element. The condition for sending the information about the second policy control network element in Manner 4 includes that binding information of a policy control network element that serves the first session corresponding to the session information is registered and binding information of a policy control network element that serves the last session corresponding to the session information is deregistered.

In Manner 1 to Manner 4, the first indication information may be understood as that first_last_indication indicates the binding support function network element to perform the following operation: when the binding information of the second policy control network element that serves the first session corresponding to the session information is registered (that is, when the first session is created), sending registration indication information of the binding information to the first policy control network element; or when the binding information of the second policy control network element that serves the last session corresponding to a session information is deregistered (that is, when the last session is terminated), sending deregistration indication information of the binding information to the first policy control network element.

Manner 5: In correspondence to (2), the first information includes the application identifier.

The first indication information may be that binding information of a second policy control network element for any session corresponding to the session information is registered. The condition for sending the information about the second policy control network element in Manner 5 is that the binding information of the second policy control network element is registered. When any session corresponding to the session information is created, the binding information of the second policy control network element that serves the session is registered with a BSF. Therefore, the first indication information may be that any session corresponding to the session information is created, and the condition for sending the information about the second policy control network element in Manner 5 is that any session corresponding to the session information is created.

Manner 6: In correspondence to (2), the first information includes the application identifier.

The first indication information may be indication information for requesting a status of the application. The indication information of the status of the application indicates the condition for sending the information about the second policy control network element. The condition for sending the information about the second policy control network element in Manner 6 is that the binding information of the second policy control network element is registered.

Manner 7: In correspondence to (2), the first information includes the application identifier.

The first indication information may be an identifier of an event that the binding information is registered. The identifier of the event that the binding information is registered indicates the condition for sending the information about the second policy control network element. The condition for sending the information about the second policy control network element in Manner 7 is that the binding information of the second policy control network element is registered.

In Manner 5 to Manner 7, because the first policy control network element needs to subscribe to an application start/stop event corresponding to an application ID from the second policy control network element, the information about the second policy control network element that is sent by the binding support function network element to the first policy control network element needs to include the identifier of the second policy control network element. The first policy control network element and the second policy control network element create an AF session based on the identifier of the second policy control network element. Therefore, when the session is terminated, the second policy control network element may notify the first policy control network element that the corresponding session is terminated, and the first policy control network element may lean of the application stop. Therefore, the binding support function network element does not need to notify the first policy control network element that the binding information of the second policy control network element is deregistered.

In Manner 5 to Manner 7, the first indication information may be understood as that a register_only_indication indicates the binding support function network element to perform the following operation: when binding information of a second policy control network element for any session corresponding to a session information combination is registered (that is, when any session is created), sending the identifier of the second policy control network element to the first policy control network element, where the binding support function network element does not need to notify that the binding information of the second policy control network element is deregistered.

Further, after receiving the first message, the binding support function network element can determine, based on the first indication information included in the first message, to send the information about the second policy control network element when the condition is met. The method procedure shown in FIG. 4 further includes the following step:

S430: The binding support function network element determines whether the condition is met.

When the binding support function network element determines that the condition is met, the method procedure shown in FIG. 4 further includes the following step:

S440: The binding support function network element sends the information about the second policy control network element to the first policy control network element.

Optionally, the binding support function network element sends a second message to the first policy control network element. The second message includes the information about the second policy control network element.

It can be learned from the several manners of the first indication information in S420 that there are the following several manners in which the binding support function network element sends the information about the second policy control network element when determining that the condition is met:

Manner 1: The condition includes that the binding information of the second policy control network element that serves the first session corresponding to the session information is registered, the condition is that the first session corresponding to the session information is created, the condition is that the binding information of the second policy control network element that serves the first session corresponding to the session information is registered with the binding support function network element, or the condition is that binding information of a second policy control network element for a first session corresponding to service session information is registered. The following uses an example in which the condition is that the binding information of the second policy control network element that serves the first session corresponding to the session information is registered for description.

When the binding information of the policy control network element that serves the first session corresponding to the session information is registered, the binding support function network element determines that the condition is met, and sends the information about the second policy control network element to the first policy control network element. The information about the second policy control network element includes the registration indication information of the binding information.

Manner 2: The condition includes that the binding information of the second policy control network element that serves the last session corresponding to the session information is deregistered, the condition is that the last session corresponding to the session information is created, the condition is that the binding information of the second policy control network element that serves the last session corresponding to the session information is deregistered from the binding support function network element, or the condition is that binding information of a second policy control network element for a last session corresponding to service session information is deregistered. The following uses an example in which the condition is that the binding information of the second policy control network element that serves the last session corresponding to the session information is deregistered for description.

When the binding information of the second policy control network element that serves the first session corresponding to the session information is deregistered, the binding support function network element determines that the condition is met, and sends the information about the second policy control network element to the first policy control network element. The information about the second policy control network element includes the deregistration indication information of the binding information.

Manner 3: The condition includes that the binding information of the second policy control network element that serves any session corresponding to the session information is registered, the condition is that any session corresponding to the session information is created, the condition is that the binding information of the second policy control network element that serves any session corresponding to the session information is registered with the binding support function network element, the condition is that the binding information of the second policy control network element is registered, or the condition is that binding information of a second policy control network element for any session corresponding to service session information is registered. The following uses an example in which the condition is that the binding information of the second policy control network element that serves any session corresponding to the session information is registered for description.

When the binding information of the second policy control network element is registered, the binding support function network element determines that the condition is met, and sends the information about the second policy control network element to the first policy control network element. The information about the second policy control network element includes the identifier of the second policy control network element.

Optionally, the information about the second policy control network element may further include the address of the user equipment.

In this embodiment, the binding support function network element sends the information about the second policy control network element only when the condition is met. This can avoid triggering registration and deregistration of the information about the second policy control network element for a plurality of times for sessions corresponding to same session information of same user equipment.

It can be learned from the AM policy deciding procedure shown in FIG. 3 that the AM policy deciding procedure involves subscription of the binding information of the SM PCF. The following describes in detail the information obtaining method provided in this application by using an example in which the information obtaining method provided in this application is applied to the subscription of the binding information of the SM PCF in the AM policy deciding procedure.

FIG. 5A and FIG. 5B show an AM policy deciding procedure according to an embodiment of this application. With reference to each step, the information obtaining method is applied to the 5G network architecture shown in FIG. 2 below.

It should be noted that in the AM policy deciding procedure shown in FIG. 5A and FIG. 5B, the foregoing user equipment is UE, the foregoing first policy control network element is an AM PCF, the foregoing second policy control network element is an SM PCF, the foregoing binding support function network element is a BSF, the foregoing application function network element is an AF, the foregoing first information includes session information of the user equipment, and the foregoing session is a PDU session.

In addition, the UE creates two PDU sessions: a PDU session #1 and a PDU session #2. The PDU session #1 is a first PDU session created by the UE, and the PDU session #2 is a last PDU session created by the UE.

The AM policy deciding procedure shown in FIG. 5A and FIG. 5B includes the following steps.

S511: The UE is registered with an AMF.

S512: The AMF interacts with the AM PCF to establish an AM policy association.

S513: The AM PCF sends a registration request message to the BSF, or the BSF receives a registration request message from the AM PCF.

S514: The AF sends a subscription request message to the BSF, or the BSF receives a subscription request message from the AF.

S515: The BSF determines registration information of the corresponding AM PCF based on an identifier of the UE, and sends a notification message to the AF, or the AF receives a notification message from the BSF.

Step S511 to step S515 are the same as the foregoing descriptions of step S310 to step S350. Details are not described herein again.

S510: The AF sends first information to the AM PCF, or the AM PCF receives first information from the AF.

The first information may be an AM policy authorization creation request message (for example, may be an Npcf_AMPolicyAuthorization_Create request).

Optionally, the first information includes the identifier of the UE, an identifier of a group to which the UE belongs, or indication information of any UE.

Further, the first information further includes service area coverage and/or high throughput indication information.

For example, when the first information includes the service area coverage, the first information further includes a DNN and S-NSSAI that are associated with the service area coverage.

For example, when the first information includes the high throughput indication information, the first information further includes a DNN and S-NSSAI that are associated with the high throughput indication information.

Optionally, the AF may further subscribe to a service area restriction (service area restriction) change event.

Optionally, the AM PCF stores an information element (for example, the identifier of the UE, the DNN and the S-NSSAI, and the service area coverage and/or the high throughput indication information) included in the first information, and then returns an Npcf_AMPolicyAuthorization_Create response.

S520: The AM PCF sends a first message to the BSF, or the BSF receives a first message from the AM PCF.

The first message may be a subscription request message (for example, may be an Nbsf_Management_Subscribe request) for subscribing to binding information of the SM PCF, and the first message carries the identifier of the UE and a combination of (DNN, S-NSSAI).

In addition, the AM PCF further includes first indication information (for example, first_last_indication) in the first message, to indicate the BSF to perform the following operation: when binding information of an SM PCF that serves a first session corresponding to the combination of (DNN, S-NSSAI) is registered (that is, when the first PDU session is created), sending registration indication information of the binding information to the AM PCF; or when binding information of an SM PCF that serves a last session corresponding to the combination of (DNN, S-NSSAI) is deregistered (that is, when the last PDU session is terminated), sending deregistration indication information of the binding information to the AM PCF.

Specifically, the first indication information may be identifiers of events that the binding information is registered and the binding information is deregistered, indication information for requesting a status of a session corresponding to the session information, or indication information of a registration status of the binding information. When the first indication information is the indication information for requesting the status of the session corresponding to the session information, or the indication information for requesting the registration status of the binding information, the AM PCF includes the identifier of the event that the binding information is registered and the identifier of the event that the binding information is deregistered in the first message sent to the BSF.

S521: The UE creates the PDU session #1.

The PDU session #1 corresponds to the combination of (DNN, S-NSSAI). An SMF allocates a UE address #1 to the PDU session #1.

For specific session creation, refer to the foregoing descriptions in S380. Details are not described herein again.

S522: The SMF interacts with the SM PCF, to establish an SM policy association #1.

Specifically, the SMF interacts with an SM PCF #1, and the SM policy association #1 corresponds to the PDU session #1.

For an SM policy association establishment procedure, refer to the foregoing descriptions in S390. Details are not described herein again.

S523: The SM PCF sends a registration request message #1 to the BSF, or the BSF receives a registration request message #1 from the SM PCF.

Specifically, the SM PCF #1 sends the registration request message #1 to the BSF.

For details, refer to the foregoing descriptions in S391. Details are not described herein again.

The PDU session #1 is a first PDU session created by the UE. The BSF sends, to the AM PCF based on the subscription in S520, a notification message that binding information of the SM PCF #1 corresponding to the combination of (DNN, S-NSSAI) is registered. The method procedure shown in FIG. 5A and FIG. 5B further includes the following steps.

S530: The BSF sends a second message to the AM PCF, or the AM PCF receives a second message from the BSF.

The second message (for example, may be an Nbsf_Management_Notify request) includes information about the SM PCF #1. The information about the SM PCF #1 indicates that the binding information of the SM PCF #1 for the PDU session #1 that corresponds to (DNN, S-NSSAI) and that is created by the UE is registered, or indicates that the SM PCF #1 for the PDU session #1 that corresponds to (DNN, S-NSSAI) and that is created by the UE is registered.

Specifically, the second message includes the identifier of the event that the binding information is registered, indicating that the binding information of the SM PCF #1 is registered or the SM PCF #1 is registered.

Optionally, the second message further includes the DNN and the S-NSSAI.

S531: The AM PCF decides an AM policy.

S532: The AM PCF sends an AM policy control update notification request message to the AMF, or the AMF receives an AM policy control update notification request message from the AM PCF.

S533: The AMF executes an updated AM policy.

Step S531 to step S533 are the same as step S396 to step S398. Details are not described herein again.

S534: The UE creates the PDU session #2.

The PDU session #2 corresponds to the combination of (DNN, S-NSSAI). The SMF allocates a UE address #2 to the PDU session #2.

S535: The SMF interacts with the SM PCF, to establish an SM policy association #2.

Specifically, the SMF interacts with an SM PCF #2, to establish the SM policy association #2.

The SM PCF #1 and the SM PCF #2 may be different SM PCFs, or may be a same SM PCF.

S536: The SM PCF sends a registration request message #2 to the BSF, or the BSF receives a registration request message #2 from the SM PCF.

Step S534 to step S536 are the same as step S380 to step S391. Details are not described herein again.

It can be learned by comparing the creation procedure of the PDU session #1 shown in steps S521, S522, S523, S530, S531, S532 and S533 and the creation procedure of the PDU session #2 shown in steps S534, S535, and S536 that steps similar to S530, S531, S532, and S533 are no longer performed in the creation procedure of the PDU session #2. For the second created PDU session #2, the BSF does not need to send, to the AM PCF, binding information of the SM PCF #2 corresponding to the PDU session #2 in this embodiment.

S537: The UE requests to terminate the PDU session #1.

For a specific PDU session termination procedure, refer to descriptions in a current related technology. This is not limited in this application.

S538: The SMF interacts with the SM PCF (for example, the SM PCF #i), to request to terminate the SM policy association #1 corresponding to the PDU session #1.

Specifically, the SMF sends an SM policy control deletion request message (for example, may be an Npcf_SMPolicyControl_delete request message) to the SM PCF (for example, the SM PCF #i), and the SM PCF #1 returns an SM policy control deletion response message (for example, may be an Npcf_SMPolicyControl_Delete response message) to the SMF.

S539: The SM PCF (for example, the SM PCF #i) sends a deregistration request message #1 to the BSF, or the BSF receives a deregistration request message #1 from the SM PCF.

The deregistration request message includes a resource identifier #1, and requests to delete the binding information of the SM PCF 1 corresponding to the PDU session #1.

S541: The UE requests to terminate the PDU session #2.

For a specific PDU session termination procedure, refer to descriptions in the current related technology. This is not limited in this application.

S542: The SMF interacts with the SM PCF (for example, the SM PCF #2), to request to terminate the SM policy association #2 corresponding to the PDU session #2.

For details, refer to the foregoing descriptions in S537. Details are not described herein again.

S543: The SM PCF (for example, the SM PCF #2) sends a deregistration request message #2 to the BSF, or the BSF receives a deregistration request message #2 from the SM PCF.

The deregistration request message includes a resource identifier #2, and requests to delete binding information of the SM PCF 2 corresponding to the PDU session #2.

The PDU session #2 is a last PDU session created by the UE. The BSF sends, to the AM PCF based on the subscription in S520, a notification message that the binding information of the SM PCF (for example, the SM PCF #2) corresponding to the combination of (DNN, S-NSSAI) is deregistered. The method procedure shown in FIG. 5A and FIG. 5B further includes the following steps.

S540: The BSF sends a second message to the AM PCF, or the AM PCF receives a second message from the BSF.

The second message (for example, may be an Nbsf_Management_Notify request) includes information about the SM PCF #2. The information about the SM PCF #2 indicates that the binding information of the SM PCF #2 for the last PDU session that corresponds to (DNN, S-NSSAI) and that is created by the UE is deregistered, or indicates that the SM PCF #2 for the last PDU session that corresponds to (DNN, S-NSSAI) and that is created by the UE is deregistered.

Optionally, the second message includes the identifier of the event that the binding information is deregistered, indicating that the binding information of the SM PCF #2 is deregistered or the SM PCF #2 is deregistered.

Optionally, the second message further includes the DNN and the S-NSSAI.

S544: The AM PCF updates an authorized AM policy based on S532.

The authorized AM policy includes an authorized service area restriction and an authorized RFSP.

S545: The AM PCF sends an updated authorized AM policy to the AMF, or the AMF receives an updated authorized AM policy from the AM PCF.

S546: The AMF executes the authorized AM policy.

In the method procedure shown in FIG. 5A and FIG. 5B, when a PDU session with a same combination of (DNN, S-NSSAI) is created, only one time of registration and one time of deregistration need to be notified.

FIG. 6A and FIG. 6B are another AM policy deciding procedure according to an embodiment of this application. With reference to each step, the information obtaining method is applied to the 5G network architecture shown in (a) in FIG. 2 or (b) in FIG. 2 below.

It should be noted that in the AM policy deciding procedure shown in FIG. 6A and FIG. 6B, the foregoing user equipment is UE, the foregoing first policy control network element is an AM PCF, the foregoing second policy control network element is an SM PCF, the foregoing binding support function network element is a BSF, the foregoing application function network element is an AF, the foregoing second information includes an application identifier, and the foregoing session is a PDU session.

The AM policy deciding procedure shown in FIG. 6A and FIG. 6B includes the following steps:

S611: The UE is registered with an AMF.

S612: The AMF interacts with the AM PCF to establish an AM policy association.

S613: The AM PCF sends a registration request message to the BSF, or the BSF receives a registration request message from the AM PCF.

S614: The AF sends a subscription request message to the BSF, or the BSF receives a subscription request message from the AF.

S615: The BSF determines registration information of the corresponding AM PCF based on an identifier of the UE, and sends a notification message to the AF, or the AF receives a notification message from the BSF.

Step S611 to step S615 are the same as step S310 to step S350. Details are not described herein again.

S610: The AF sends first information to the AM PCF, or the AM PCF receives first information from the AF.

The first information may be an AM policy authorization creation request message (for example, may be an Npcf_AMPolicyAuthorization_Create request).

The first information includes the identifier of the UE, an identifier of a group to which the UE belongs, or indication information of any UE.

Further, the first information further includes service area coverage and/or high throughput indication information.

For example, when the first information includes the service area coverage, the first information further includes an application ID associated with the service area coverage.

For example, when the first information includes the high throughput indication information, the first information further includes an application ID associated with the high throughput indication information.

Optionally, the first information further includes a combination of (DNN, S-NSSAI).

Optionally, the AF may further subscribe to a service area restriction change event.

Optionally, the AM PCF stores information (for example, the identifier of the UE, the DNN and the S-NSSAI, and the service area coverage and/or the high throughput indication information) included in the first information, and then returns an Npcf_AMPolicyAuthorization_Create response.

S620: The AM PCF sends a first message to the BSF, or the BSF receives a first message from the AM PCF.

The first message may be a subscription request message (for example, may be an Nbsf_Management_Subscribe request) for subscribing to binding information of the SM PCF, and the first message carries the identifier of the UE and a combination of (DNN, S-NSSAI).

It should be noted that, when the first information does not include the combination of (DNN, S-NSSAI), before sending the first message to the BSF, the AM PCF needs to determine the combination of (DNN, S-NSSAI) based on the received application ID.

In addition, the AM PCF further includes first indication information (for example, a register_only_indication) in the first message, to indicate the BSF to perform the following operation: when binding information of an SM PCF that serves any session corresponding to the combination of (DNN, S-NSSAI) is registered (that is, when any session is created), sending an identifier of the SM PCF to the AM PCF; or indicate the BSF to perform the following operation: when an SM PCF that serves any session corresponding to the combination of (DNN, S-NSSAI) is registered, sending an identifier of the SM PCF to the AM PCF.

For example, the first indication information may be an identifier of an event that the binding information is registered, or indication information for requesting a status of an application. When the first indication information is the indication information for requesting the status of the application, the first message may further carry the identifier of the event that the binding information is registered.

S621: The UE creates a PDU session.

The PDU session corresponds to the combination of (DNN, S-NSSAI). An SMF allocates a UE address #1 to the PDU session.

S622: The SMF interacts with the SM PCF to establish an SM policy association.

S623: The SM PCF sends a registration request message to the BSF, or the BSF receives a registration request message from the SM PCF #.

Step S621 to step S623 are the same as step S380 to step S391. Details are not described herein again.

A PDU session #1 is any PDU session created by the UE. The BSF sends, to the AM PCF based on the subscription in S520, a notification message that the binding information of the SM PCF corresponding to the combination of (DNN, S-NSSAI) is registered. The method procedure shown in FIG. 6A and FIG. 6B further includes the following steps.

S630: The BSF sends a second message to the AM PCF, or the AM PCF receives a second message from the BSF.

The second message (for example, may be an Nbsf_Management_Notify request) includes information about the SM PCF, the information about the SM PCF includes the identifier of the SM PCF, the information about the SM PCF indicates that the binding information of the SM PCF is registered, and the identifier of the SM PCF identifies the SM PCF.

Optionally, the second message further includes the UE address #1.

Optionally, the second message may further include the identifier of the event that the binding information is registered.

S631: The AM PCF sends a policy authorization subscription message to the SM PCF, or the SM PCF receives a policy authorization subscription message from the AM PCF.

S632: The SM PCF interacts with the SMF, to request to detect an application start/stop event corresponding to the application ID.

S633: The SM PCF sends a notification message to the AM PCF, or the AM PCF receives a notification message from the SM PCF.

S634: The AM PCF decides an AM policy.

S635: The AM PCF sends an AM policy control update notification request message to the AMF, or the AMF receives an AM policy control update notification request message from the AM PCF.

S636: The AMF executes an updated AM policy.

Step S631 to step S636 are the same as step S393 to step S398. Details are not described herein again.

S637: The UE requests to terminate the PDU session.

For a specific PDU session termination procedure, refer to descriptions in a current related technology. This is not limited in this application.

S638: The SMF interacts with the SM PCF, to request to terminate the SM policy association corresponding to the PDU session.

For details, refer to the foregoing descriptions in S537. Details are not described herein again.

S639: The SM PCF sends a notification message to the AM PCF, or the AM PCF receives a notification message from the SM PCF.

The notification message (for example, may be Npcf_PolicyAuthorization_Notify) carries an indication for terminating an AF session and a cause value for PDU session termination.

S640: The AM PCF updates an authorized AM policy based on S635.

S641: The AM PCF sends an updated authorized AM policy to the AMF, or the AMF receives an updated authorized AM policy from the AM PCF.

S642: The AMF executes the authorized AM policy.

S643: The SM PCF sends a deregistration request message to the BSF, or the BSF receives a deregistration request message from the SM PCF.

The deregistration request message (for example, may be an Nbsf_Management_Deregister Request) is for requesting to delete the binding information of the SM PCF.

Because of the Register_Only_Indication, the BSF does not send, to the AM PCF, a notification that the binding information of the SM PCF is deregistered.

Step S643 is performed after step S638.

In the method procedure shown in FIG. 6A and FIG. 6B, when a PDU session with a same combination of (DNN, S-NSSAI) is created, only that the binding information of the SM PCF is deregistered needs to be notified, and the BSF does not need to notify that the binding information of the SM PCF is deregistered.

It should be understood that specific examples shown in FIG. 5A and FIG. 5B and FIG. 6A and FIG. 6B in embodiments of this application are merely intended to help a person skilled in the art better understand embodiments of this application, but are not intended to limit the scope of embodiments of this application. For example, the AM policy deciding procedure is used as an example for description for a procedure in a specific embodiment. The information obtaining method provided in this application is not limited to not being applicable only to the AM policy deciding procedure, but is also applicable to another procedure related to binding information subscription of the SM PCF.

It should be further understood that a sequence number of each of the foregoing processes does not mean an order of an execution sequence. The execution sequence of each process should be determined based on a function and internal logic of each process, and should not be construed as any limitation on the implementation processes of embodiments of this application.

It should be further understood that in embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

It should be further understood that in some of the foregoing embodiments, a network element (such as an AF, a PCF, or an SMF) in an existing network architecture is mainly used as an example for description. It should be understood that a specific form of the network element is not limited in embodiments of this application. For example, all network elements that can implement a same function in the future are applicable to embodiments of this application.

It may be understood that, in the foregoing method embodiments, the methods and operations implemented by the network device (for example, each network element) may also be implemented by a component (for example, a chip or a circuit) that can be used in the network device.

It should be noted that the foregoing describes the methods by using an example in which the "session" in this application is a PDU session and the "user equipment" in this application is UE. During actual application, the PDU session may be replaced with another session, and the UE may be replaced with another user equipment. This is not limited in this application.

The foregoing describes in detail the information obtaining method provided in embodiments of this application with reference to FIG. 4 to FIG. 6A and FIG. 6B. The foregoing information obtaining method is mainly described from a perspective of interaction between network elements. It may be understood that, to implement the foregoing function, each network element includes a corresponding hardware structure and/or software module for performing the function.

A person skilled in the art should be aware that, with reference to units and algorithm steps in the examples described in embodiments disclosed in this specification, this application can be implemented by hardware or a combination of hardware and computer hardware. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

The following describes in detail an information subscription apparatus provided in embodiments of this application with reference to FIG. 7 to FIG. 9. It should be understood that descriptions of apparatus embodiments correspond to the descriptions of the method embodiments. Therefore, for content that is not described in detail, refer to the foregoing method embodiments. For brevity, some content is not described in detail again.

In embodiments of this application, function module division may be performed on a transmitting end device or a receiving end device based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in embodiments of this application, module division is an example, and is merely logical function division. During actual implementation, another division manner may be used. An example in which each function module is obtained through division based on each corresponding function is used below for description.

FIG. 7 is a schematic block diagram of an apparatus 700 according to an embodiment of this application. The apparatus 700 includes a transceiver unit 710 and a processing unit 720. The transceiver unit 710 may implement a corresponding communication function, and the processing unit 720 is configured to perform data processing. The transceiver unit 710 may also be referred to as a communication interface or a communication unit.

Optionally, the apparatus 700 may further include a storage unit. The storage unit may be configured to store instructions and/or data. The processing unit 720 may read the instructions and/or the data in the storage unit, to enable the apparatus to implement the foregoing method embodiments.

Alternatively, the apparatus 700 may be configured to perform actions performed by the network device (for example, each network element) in the foregoing method embodiments. In this case, the apparatus 700 may be the network device or a component that can be disposed in the network device, the transceiver unit 710 is configured to perform receiving/sending-related operations on a network device side in the foregoing method embodiments, and the processing unit 720 is configured to perform processing-related operations on the network device side in the foregoing method embodiments.

In a design, the apparatus 700 is configured to perform an action performed by the first policy control network element in the foregoing method embodiments.

In a possible implementation, the transceiver unit 710 is configured to receive first information of user equipment from an application function network element. The first information is for deciding a mobility management policy, the first information includes session information of the user equipment, and the first policy control network element is a network element that decides the mobility management policy.

The transceiver unit 710 is further configured to send, to a binding support function network element, a message for obtaining information about a second policy control network element. The second policy control network element is a policy control network element that serves a session corresponding to the session information, that the message for obtaining information about the second policy control network element includes the session information and first indication information, and the first indication information indicates a condition for sending the information about the second policy control network element.

Optionally, the transceiver unit 710 is further configured to receive the information about the second policy control network element from the binding support function network element.

The apparatus 700 may implement steps or procedures corresponding to the first policy control network element in the method embodiments according to embodiments of this application. The apparatus 700 may include units configured to perform the method performed by the first policy control network element in the method embodiments. In addition, the units in the apparatus 700 and the foregoing other operations and/or functions are separately intended to implement corresponding procedures in the method embodiments of the first policy control network element in the method embodiments.

When the apparatus 700 is configured to perform the method in FIG. 4, the transceiver unit 710 may be configured to perform receiving and sending steps in the method, for example, steps S410, S420, and S440.

When the apparatus 700 is configured to perform the method in FIG. 5A and FIG. 5B, the transceiver unit 710 may be configured to perform receiving and sending steps in the method, for example, steps S512, S513, S510, S520, S530, S532 and S545. The processing unit 720 may be configured to perform processing steps in the method, for example, steps S531 and S544.

When the apparatus 700 is configured to perform the method in FIG. 6A and FIG. 6B, the transceiver unit 710 may be configured to perform receiving and sending steps in the method, for example, steps S612, S613, S610, S620, S630, S631, S633, S635, S639 and S641. The processing unit 720 may be configured to perform processing steps in the method, for example, steps S644 and S640.

It should be understood that a specific process in which the units perform the foregoing corresponding steps is described in detail in the foregoing method embodiments, and for brevity, details are not described herein again.

In another design, the apparatus 700 is configured to perform an action performed by the binding support function network element in the foregoing method embodiments.

In a possible implementation, the transceiver unit 710 is configured to receive, from a first policy control network element, a message for obtaining information about a second policy control network element. The second policy control network element is a policy control network element that serves a session corresponding to session information, the message for obtaining the information about the second policy control network element includes the session information and first indication information, and the first indication information indicates a condition for sending the information about the second policy control network element.

The processing unit 720 is configured to determine whether a condition for sending the information about the second policy control network element is met.

When the condition for sending the information about the second policy control network element is met, the transceiver unit 710 is further configured to send the information about the second policy control network element to the first policy control network element.

The apparatus 700 may implement steps or procedures corresponding to the binding support function network element in the method embodiments according to embodiments of this application. The apparatus 700 may include units configured to perform the method performed by the binding support function network element in the method embodiments. In addition, the units in the apparatus 700 and the foregoing other operations and/or functions are separately intended to implement corresponding procedures in the method embodiments of the binding support function network element in the method embodiments.

When the apparatus 700 is configured to perform the method in FIG. 4, the transceiver unit 710 may be configured to perform receiving and sending steps in the method, for example, steps S420 and S440. The processing unit 720 may be configured to perform processing steps in the method, for example, step S430.

When the apparatus 700 is configured to perform the method in FIG. 5A and FIG. 5B, the transceiver unit 710 may be configured to perform sending and receiving steps in the method, for example, steps S513, S514, S515, S520, S523, S530, S536, S539, S543 and S540.

When the apparatus 700 is configured to perform the method in FIG. 6A and FIG. 6B, the transceiver unit 710 may be configured to perform receiving and sending steps in the method, for example, steps S613, S614, S616, S620, S623, S630 and S643.

It should be understood that a specific process in which the units perform the foregoing corresponding steps is described in detail in the foregoing method embodiments, and for brevity, details are not described herein again.

The processing unit 720 in the foregoing embodiment may be implemented by at least one processor or a processor-related circuit. The transceiver unit 710 may be implemented by a transceiver or a transceiver-related circuit. The storage unit may be implemented by at least one memory.

As shown in FIG. 8, an embodiment of this application further provides an apparatus 800. The apparatus 800 includes a processor 810, and may further include one or more memories 820. The processor 810 is coupled to the memory 820. The memory 820 is configured to store a computer program or instructions and/or data. The processor 810 is configured to execute the computer program or the instructions and/or the data stored in the memory 820, to perform the method in the foregoing method embodiments. Optionally, the apparatus 800 includes one or more processors 810.

Optionally, the memory 820 may be integrated with the processor 810, or separately disposed.

Optionally, as shown in FIG. 8, the apparatus 800 may further include a transceiver 830, and the transceiver 830 is configured to receive and/or send a signal. For example, the processor 810 is configured to control the transceiver 830 to receive and/or send a signal.

In a solution, the apparatus 800 is configured to implement operations performed by the network device (for example, each network element) in the foregoing method embodiments.

An embodiment of this application further provides an apparatus 900. The apparatus 900 may be a network device or a chip. The apparatus 900 may be configured to perform operations performed by the network device (for example, each network element) in the foregoing method embodiments.

FIG. 9 is a simplified schematic diagram of a structure of the apparatus. The apparatus 900 includes a part 910 and a part 920. The part 910 is mainly configured to send and receive a radio frequency signal, and perform conversion between the radio frequency signal and a baseband signal. The part 920 is mainly configured to perform baseband processing, control the base station, and so on. The part 910 may be usually referred to as a transceiver unit, a transceiver machine, a transceiver circuit, a transceiver, or the like. The part 920 is usually a control center of the base station, may be usually referred to as a processing unit, and is configured to control the base station to perform processing operations on a receiving end device side in the foregoing method embodiments.

The transceiver unit in the part 910 may also be referred to as a transceiver, a transceiver machine, or the like, and includes an antenna and a radio frequency circuit. The radio frequency circuit is mainly configured to perform radio frequency processing. Optionally, a component for implementing a receiving function in the part 910 may be considered as a receiving unit, and a component for implementing a sending function may be considered as a sending unit. In other words, the part 910 includes the receiving unit and the sending unit. The receiving unit may also be referred to as a receiver machine, a receiver, a receiving circuit, or the like. The sending unit may be referred to as a transmitter machine, a transmitter, a transmitting circuit, or the like.

The part 920 may include one or more boards, and each board may include one or more processors and one or more memories. The processor is configured to read and execute a program in the memory, to implement a baseband processing function and control the base station. If there are a plurality of boards, the boards may be interconnected with each other, to enhance a processing capability. In an optional implementation, a plurality of boards may share one or more processors, a plurality of boards may share one or more memories, or a plurality of boards may simultaneously share one or more processors.

It should be understood that FIG. 9 is merely an example instead of a limitation. The network device including the transceiver unit and the processing unit may not depend on the structure shown in FIG. 9.

When the apparatus 900 is the chip, the chip includes a transceiver unit and a processing unit. The transceiver unit may be an input/output circuit or a communication interface. The processing unit is a processor, a microprocessor, or an integrated circuit integrated on the chip. Certainly, the apparatus 900 may alternatively be a chip system or a processing system, so that a device in which the apparatus 900 is installed can implement the methods and the functions in embodiments of this application. For example, the processing unit 920 may be a chip system or a processing circuit in a processing system, to control a device in which the chip system or the processing system is installed. The processing unit may be further coupled to a storage unit, and invoke instructions in the storage unit, to enable the device to implement the methods and the functions in embodiments of this application. The transceiver unit 910 may be an input/output circuit in the chip system or the processing system, to output information processed by the chip system, or input to-be-processed data or signaling information into the chip system for processing.

An embodiment of this application further provides a computer-readable storage medium. The computer-readable storage medium stores computer instructions for implementing the method performed by the network device (for example, each network element) in the foregoing method embodiments.

For example, when a computer program is executed by a computer, the computer is enabled to implement the method performed by the network device in the foregoing method embodiments.

An embodiment of this application further provides a computer program product including instructions. When the instructions are executed by a computer, the computer is enabled to implement the method performed by the network device (for example, each network element) in the foregoing method embodiments.

An embodiment of this application further provides a communication system. The communication system includes the network device (for example, each network element) in the foregoing embodiments, for example, includes an AM PCF and a BSF.

For explanations and beneficial effects of related content of any one of the apparatuses provided above, refer to the corresponding method embodiments provided above. Details are not described herein again.

It should be understood that, the processor in embodiments of this application may be a central processing unit (CPU), or may be another general-purpose processor, a digital signal processor (DSP), an application-specific integrated circuit (ASIC), a field programmable gate array (FPGA), or another programmable logic device, a discrete gate or a transistor logic device, a discrete hardware component, or the like. The general-purpose processor may be a microprocessor, or the processor may be any conventional processor or the like.

It should be further understood that the memory mentioned in embodiments of this application may be a volatile memory and/or a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM). For example, the RAM may be used as an external cache. By way of example, and not limitation, the RAM may include the following plurality of forms: a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (storage module) may be integrated into the processor.

It should further be noted that the memory described in this specification aims to include but is not limited to these memories and any memory of another appropriate type.

A person of ordinary skill in the art may be aware that, in combination with the examples described in embodiments disclosed in this specification, units and methods can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the protection scope of this application.

In the several embodiments provided in this application, it should be understood that the disclosed apparatus and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings, direct couplings, or communication connections may be implemented through some interfaces. Indirect couplings or communication connections between the apparatuses or units may be implemented in an electronic form, a mechanical form, or another form.

The units described as separate parts may or may not be physically separate, and parts displayed as units may or may not be physical units, may be located at one position, or may be distributed on a plurality of network units. Some or all of the units may be selected based on actual requirements to implement the solutions provided in this application.

In addition, function units in embodiments of this application may be integrated into one unit, each of the units may exist alone physically, or two or more units are integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a special-purpose computer, a computer network, or other programmable apparatuses. For example, the computer may be a personal computer, a server, or a network device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like. For example, the usable medium may include but is not limited to any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

receiving, by a first policy control network element, first information of a user equipment from an application function network element, wherein the first information comprises session information of the user equipment, and the first policy control network element decides a mobility management policy based on the first information; and sending, by the first policy control network element to a binding support function network element, a message for obtaining information about a second policy control network element, wherein the second policy control network element serves a session corresponding to the session information, and wherein the message for obtaining the information about the second policy control network element comprises the session information and first indication information, and the first indication information indicates a condition for sending the information about the second policy control network element.

2. The method according to claim 1, wherein the condition comprises that binding information of the second policy control network element that serves a first session corresponding to the session information is registered, and wherein the method further comprises:

receiving, by the first policy control network element, the information about the second policy control network element from the binding support function network element, wherein the information about the second policy control network element comprises registration indication information, and wherein the binding information of the second policy control network element that serves the first session is registered.

3. The method according to claim 1, wherein the condition comprises that binding information of the second policy control network element that serves a last session corresponding to the session information is deregistered, and wherein the method further comprises:

receiving, by the first policy control network element, the information about the second policy control network element from the binding support function network element, wherein the information about the second policy control network element comprises deregistration indication information, and wherein the binding information of the second policy control network element that serves the last session is deregistered.

4. The method according to claim 1, wherein the first information further comprises an application identifier, and the condition comprises that binding information of the second policy control network element is registered, and wherein the method further comprises:

receiving, by the first policy control network element, the information about the second policy control network element from the binding support function network element, wherein the information about the second policy control network element comprises an identifier of the second policy control network element, and wherein the binding information of the second policy control network element is registered.

5. The method according to claim 4, wherein the method further comprises:

receiving, by the first policy control network element, session termination indication information from the second policy control network element; and updating, by the first policy control network element, the mobility management policy based on the session termination indication information.

6. The method according to claim 1, wherein the first indication information requests a status of the session corresponding to the session information, wherein the first indication information requests a registration status of binding information of the second policy control network element, wherein the first indication information indicates a first identifier of a first event that the binding information is registered and a second identifier of a second event that the binding information is deregistered, or wherein the first indication information indicates the condition.

7. The method according to claim 1, wherein the session information indicates single network slice selection assistance information (S-NSSAI) and a data network name (DNN).

8. A communication system, wherein the communication system comprises:

a first policy control network element and a binding support function network element, wherein the first policy control network element includes first one or more processors and a first memory, wherein the binding support function network element includes second one or more processors and a second memory, wherein the first policy control network element is configured to:

receive first information of a user equipment from an application function network element, wherein the first information comprises session information of the user equipment, and the first policy control network element decides a mobility management policy based on the first information; and send, to the binding support function network element, a message for obtaining information about a second policy control network element, wherein the second policy control network element serves a session corresponding to the session information, wherein the message for obtaining the information about the second policy control network element comprises the session information and first indication information, and the first indication information indicates a condition for sending the information about the second policy control network element; and wherein the binding support function network element is configured to:

receive, from the first policy control network element, the message for obtaining the information about the second policy control network element.

9. The communication system according to claim 8, wherein the condition comprises that binding information of the second policy control network element that serves a first session is registered, and the binding support function network element is further configured to:

based on that the binding information of the second policy control network element that serves the first session is registered, send the information about the second policy control network element to the first policy control network element, wherein the information about the second policy control network element comprises registration indication information.

10. The communication system according to claim 8, wherein the condition comprises that binding information of the second policy control network element that serves a last session corresponding to the session information is deregistered, and wherein the binding support function network element is further configured to:

based on that the binding information of the second policy control network element that serves the last session is deregistered, send the information about the second policy control network element to the first policy control network element, wherein the information about the second policy control network element comprises deregistration indication information.

11. The communication system according to claim 8, wherein the first information further comprises an application identifier, wherein the condition is that binding information of the second policy control network element is registered, and wherein the binding support function network element is further configured to:

based on that the binding information of the second policy control network element is registered, send the information about the second policy control network element to the first policy control network element, wherein the information about the second policy control network element comprises an identifier of the second policy control network element.

12. The communication system according to claim 8, wherein the first policy control network element is further configured to:

receive session termination indication information sent by the second policy control network element; and update the mobility management policy based on the session termination indication information.

13. An apparatus, comprising:

one or more processors and a memory, wherein the memory is configured to store a computer program, and the one or more processors are configured to invoke and run the computer program stored in the memory, to cause the apparatus to perform operations including:

receiving first information of user equipment from an application function network element, wherein the first information comprises session information of the user equipment, and the apparatus decides a mobility management policy based on the first information; and sending to a binding support function network element, a message for obtaining information about a second policy control network element, wherein the second policy control network element serves a session corresponding to the session information, and wherein the message for obtaining the information about the second policy control network element comprises the session information and first indication information, and the first indication information indicates a condition for sending the information about the second policy control network element.

14. The apparatus according to claim 13, wherein the condition comprises that binding information of the second policy control network element that serves a first session corresponding to the session information is registered, the operations further comprising:

receiving the information about the second policy control network element from the binding support function network element, wherein the information about the second policy control network element comprises registration indication information, and wherein the binding information of the second policy control network element that serves the first session is registered.

15. The apparatus according to claim 13, wherein the condition comprises that binding information of the second policy control network element that serves a last session corresponding to the session information is deregistered, the operations further comprising:

receiving the information about the second policy control network element from the binding support function network element, wherein the information about the second policy control network element comprises deregistration indication information, and wherein the binding information of the second policy control network element that serves the last session is deregistered.

16. The apparatus according to claim 13, wherein the first information further comprises an application identifier, and the condition comprises that binding information of the second policy control network element is registered, the operations further comprising:

receiving the information about the second policy control network element from the binding support function network element, wherein the information about the second policy control network element comprises an identifier of the second policy control network element, and wherein the binding information of the second policy control network element is registered.

17. The apparatus according to claim 16, the operations further comprising:

receiving session termination indication information from the second policy control network element; and updating the mobility management policy based on the session termination indication information.

18. The apparatus according to claim 13, wherein the first indication information requests a status of the session corresponding to the session information, wherein the first indication information requests a registration status of binding information of the second policy control network element, wherein the first indication information indicates a first identifier of a first event that the binding information is registered and a second identifier of a second event that the binding information is deregistered, or wherein the first indication information indicates the condition.

19. The apparatus according to claim 13, wherein the session information indicates single network slice selection assistance information (S-NSSAI) and a data network name (DNN).

* * * * *